(12) United States Patent
Kim et al.

(10) Patent No.: US 8,417,091 B2
(45) Date of Patent: Apr. 9, 2013

(54) IPTV RECEIVER AND METHOD FOR PERFORMING A PERSONAL VIDEO RECORDER FUNCTION IN THE IPTV RECEIVER

(75) Inventors: Kyung Ho Kim, Seoul (KR); Hyeong Ho Son, Seoul (KR); Joon Hui Lee, Seoul (KR); Jong Yeul Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 539 days.

(21) Appl. No.: 12/654,829

(22) Filed: Jan. 5, 2010

(65) Prior Publication Data

US 2010/0178031 A1    Jul. 15, 2010

Related U.S. Application Data

(60) Provisional application No. 61/142,616, filed on Jan. 5, 2009.

(51) Int. Cl.
*H04N 5/765* (2006.01)
*H04N 9/80* (2006.01)

(52) U.S. Cl. ........................................ 386/231; 386/243

(58) Field of Classification Search ........................ None
See application file for complete search history.

(56) References Cited

U.S. PATENT DOCUMENTS

| 2002/0174433 | A1 | 11/2002 | Baumgartner et al. |
| 2005/0034171 | A1 | 2/2005 | Benya |
| 2007/0058933 | A1* | 3/2007 | Kobayashi et al. ............. 386/95 |
| 2007/0130601 | A1 | 6/2007 | Li et al. |
| 2007/0277205 | A1* | 11/2007 | Grannan ......................... 725/80 |
| 2008/0232763 | A1* | 9/2008 | Brady .............................. 386/46 |
| 2009/0043842 | A1* | 2/2009 | Rhim et al. .................... 709/203 |
| 2010/0161713 | A1* | 6/2010 | Gangadharappa et al. ... 709/203 |
| 2010/0310227 | A1* | 12/2010 | Baumgartner et al. ........ 386/200 |

FOREIGN PATENT DOCUMENTS

| WO | WO 2007/101473 A1 | 9/2007 |
| WO | WO 2008/078854 A1 | 7/2008 |
| WO | WO 2008/137916 A1 | 11/2008 |

* cited by examiner

*Primary Examiner* — William C Vaughn, Jr.
*Assistant Examiner* — Asher Khan
(74) *Attorney, Agent, or Firm* — McKenna Long & Aldridge LLP

(57) ABSTRACT

An IPTV receiver and a method for performing a Personal Video Recorder (PVR) function in the IPTV receiver are disclosed. Herein, the method can include downloading a widget application from a server, receiving a first request for executing the downloaded widget application from a user, executing the downloaded widget application according to the first request at a browser, receiving a second request for performing a specific PVR function through the executed widget application from the user and performing the specific PVR function according to the second request.

14 Claims, 20 Drawing Sheets

FIG. 6

```xml
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings" minOccurs="0" maxOccurs="unbounded"/>
    <xs:element name="IPEncapsulations" type="ns1:tIPEncapsulations" minOccurs="0" maxOccurs="unbounded"/>
    <xs:element name="Extension" type="ns1:tExtension" minOccurs="0"/>
    <xs:any namespace="##other" processContents="lax" minOccurs="0" maxOccurs="unbounded"/>
    <xs:element name="GraphicResolution" type="ns1:tGraphicResolution" minOccurs="0"/>
    <xs:element name="GraphicColors" type="ns1:tGraphicColors" minOccurs="0"/>
    <xs:element name="AvailableResources" type="ns1:tAvailableResources" minOccurs="0"/>
    <xs:element name="PVR" type="ns1:tPVR" minOccurs="0"/>
  </xs:sequence>
</xs:complexType>
<xs:complexType name="tGraphicColors">
  <xs:attribute name="colorDepth">
    <xs:simpleType>
      <xs:restriction base="xs:string">
        <xs:enumeration value="32bpp"/>
        <xs:enumeration value="24bpp"/>
        <xs:enumeration value="16bpp"/>
        <xs:enumeration value="8bpp"/>
        <xs:enumeration value=""/>
      </xs:restriction>
    </xs:simpleType>
  </xs:attribute>
</xs:complexType>
<xs:complexType name="tGraphicResolution">
  <xs:attribute name="HorizontalSize" type="xs:integer"/>
  <xs:attribute name="VerticalSize" type="xs:integer"/>
  <xs:attribute name="Rotate" type="xs:boolean"/>
</xs:complexType>
<xs:complexType name="tAvailableResources">
<xs:sequence>
    <xs:element name="nonVolatileMemory" type="xs:unsignedInt" minOccurs="0"/>
    <xs:element name="VolatileMemory" type="xs:unsignedInt" minOccurs="0"/>
  </xs:sequence>
</xs:complexType>
<xs:complexType name="tPVR">
  <xs:sequence>
    <xs:element name="playbackcontrol" type="xs:string" minOccurs="0"/>
    <xs:element name="streameditor" type="xs:string" minOccurs="0"/>
    <xs:element name="contentmanager" type="xs:string" minOccurs="0"/>
    <xs:element name="timeshift" type="xs:string" minOccurs="0"/>
  </xs:sequence>
</xs:complexType>
```

FIG. 9

```
<complexType name="DeviceInfoType">
  <sequence>
    <element name="Manufacturer">
      <simpleType>
        <restriction base="string"><maxLength value="64"/></restriction>
      </simpleType>
    </element>
    <element name="ManufacturerOUI">
      <simpleType>
        <restriction base="string"><maxLength value="6"/></restriction>
      </simpleType>
    </element>
    <element name="ModelName">
      <simpleType>
        <restriction base="string"><maxLength value="64"/></restriction>
      </simpleType>
    </element>
    <element name="Description">
      <simpleType>
        <restriction base="string"><maxLength value="256"/></restriction>
      </simpleType>
    </element>
    <element name="ProductClass">
      <simpleType>
        <restriction base="string"><maxLength value="64"/></restriction>
      </simpleType>
    </element>
    <element name="SerialNumber">
      <simpleType>
        <restriction base="string"><maxLength value="64"/></restriction>
      </simpleType>
    </element>
    <element name="HardwareVersion">
      <simpleType>
        <restriction base="string"><maxLength value="64"/></restriction>
      </simpleType>
    </element>
    <element name="SoftwareVersion">
      <simpleType>
        <restriction base="string"><maxLength value="64"/></restriction>
      </simpleType>
    </element>
    <element name="EnabledOptions">
      <simpleType>
        <restriction base="string"><maxLength value="1024"/></restriction>
      </simpleType>
    </element>
    <element name="AdditionalHardwareVersion">
      <simpleType>
        <restriction base="string"><maxLength value="64"/></restriction>
      </simpleType>
    </element>
```

FIG. 10

```xml
<element name="AdditionalSoftwareVersion">
  <simpleType>
    <restriction base="string"><maxLength value="64"/></restriction>
  </simpleType>
</element>
<element name="ProvisioningCode">
  <simpleType>
    <restriction base="string"><maxLength value="64"/></restriction>
  </simpleType>
</element>
<element name="DeviceStatus">
  <simpleType>
    <restriction base="string">
      <enumeration value="Up"/>
      <enumeration value="Initializing"/>
      <enumeration value="Error"/>
      <enumeration value="Disabled"/>
    </restriction>
  </simpleType>
</element>
<element name="Uptime" type="unsignedInt"/>
<element name="FirstUseDate" type="dateTime"/>
<element name="DeviceLog">
  <simpleType>
    <restriction base="string">
      <maxLength value="32768"/>
    </restriction>
  </simpleType>
</element>
<element name="AvailableResources" type="rc:AvailableResourcesType"/>
</sequence>
</complexType>
<complexType name="AvailableResourcesType">
  <sequence>
    <element name="nonVolatileMemory" type="unsignedInt" minOccurs="0"/>
    <element name="VolatileMemory" type="unsignedInt" minOccurs="0"/>
  </sequence>
</complexType>
```

FIG. 12

```xml
<complexType name="STBServiceCapabilitiesType">
  <sequence>
    <element name="FrontEnd" type="rc:FrontEndType"/>
    <element name="PVR" type="rc:PVRType"/>
    <element name="AudioDecoder" type="rc:AudioDecoderType"/>
    <element name="VideoDecoder" type="rc:VideoDecoderType"/>
    <element name="AudioOutput" type="rc:AudioOutputType"/>
    <element name="VideoOutput" type="rc:VideoOutputType"/>
    <element name="CA" type="rc:CAType"/>
    <element name="DRM" type="rc:DRMType"/>
    <element name="ServiceMonitoring" type="rc:ServiceMonitoringType"/>
    <element name="AudienceStats" type="rc:AudienceStatsType"/>
    <element name="Graphic" type="rc:GraphicType"/>
  </sequence>
  <attribute name="MaxActiveAVStreams" type="rc:MaximunNumberType"/>
  <attribute name="MaxActiveAVPlayers" type="rc:MaximunNumberType"/>
</complexType>
<annotation>
  <documentation>STBServiceType</documentation>
</annotation>
<complexType name="STBServiceType">
  <sequence>
    <element name="Capabilities" type="rc:STBServiceCapabilitiesType" maxOccurs="unbounded"/>
  </sequence>
</complexType>
<complexType name="GraphicColorsType">
  <attribute name="colorDepth">
    <simpleType>
      <restriction base="string"/>
    </simpleType>
  </attribute>
</complexType>
<complexType name="GraphicResolutionType">
  <attribute name="HorizontalSize" type="integer"/>
  <attribute name="VerticalSize" type="integer"/>
  <attribute name="Rotate" type="boolean"/>
</complexType>
<complexType name="GraphicType">
  <sequence>
    <element name="GraphicResolution" type="rc:GraphicResolutionType"/>
    <element name="GraphicColor" type="rc:GraphicColorsType"/>
  </sequence>
</complexType>
<complexType name="PVRType">
  <sequence>
    <element name="playbackcontrol" type="string" minOccurs="0"/>
    <element name="streameditor" type="string" minOccurs="0"/>
    <element name="contentmanager" type="string" minOccurs="0"/>
    <element name="timeshift" type="string" minOccurs="0"/>
  </sequence>
  <attribute name="MaxIOStreams" type="rc:MaximunNumberType"/>
  <attribute name="MaxRecordingStreams" type="rc:MaximunNumberType"/>
  <attribute name="MaxPlaybackStreams" type="rc:MaximunNumberType"/>
  <attribute name="MaxTimeDelay" type="rc:MaximunNumberType"/>
</complexType>
```

FIG. 14

```
<xs:complexType name="tUEProfile">
  <xs:sequence>
    <xs:element name="UserEquipmentID" type="ns1:tUEID"/>
    <xs:element name="UserEquipmentClass" type="ns1:tUserEquipmentClass"/>
    <xs:element name="Resolution" type="ns1:tResolution" minOccurs="0"/>
    <xs:element name="SupportedEncodings" type="ns1:tSupportedEncodings" minOccurs="0" maxOccurs="unbounded"/>
    <xs:element name="IPEncapsulations" type="ns1:tIPEncapsulations" minOccurs="0" maxOccurs="unbounded"/>
    <xs:element name="Extension" type="ns1:tExtension" minOccurs="0"/>
    <xs:any namespace="##other" processContents="lax" minOccurs="0" maxOccurs="unbounded"/>
    <xs:element name="GraphicResolution" type="ns1:tGraphicResolution" minOccurs="0"/>
    <xs:element name="GraphicColors" type="ns1:tGraphicColors" minOccurs="0"/>
    <xs:element name="AvailableResources" type="ns1:tAvailableResources" minOccurs="0"/>
    <xs:element name="SupportedFilters" type="ns1:tSupportedFilters" minOccurs="0"/>
    <xs:element name="ApplicationSettings" type="ns1:tApplicationSetting" minOccurs="0" maxOccurs="unbounded"/>
  </xs:sequence>
</xs:complexType>
<xs:complexType name="tApplicationSetting">
  <xs:sequence>
    <xs:element name="ApplicationID" type="xs:string" minOccurs="0"/>
    <xs:element name="RevisionNumber" type="xs:string" minOccurs="0"/>
    <xs:element name="Settings" minOccurs="0">
      <xs:complexType>
        <xs:sequence>
          <xs:element name="Position" type="xs:unsignedInt" minOccurs="0"/>
          <xs:element name="Extension" type="ns1:tExtension" minOccurs="0"/>
          <xs:any namespace="##other" processContents="lax" minOccurs="0" maxOccurs="unbounded"/>
        </xs:sequence>
      </xs:complexType>
    </xs:element>
  </xs:sequence>
</xs:complexType>
```

IPTV RECEIVER AND METHOD FOR PERFORMING A PERSONAL VIDEO RECORDER FUNCTION IN THE IPTV RECEIVER

This application claims the benefit of U.S. Provisional Application No. 61/142,616, filed on Jan. 5, 2009, which is hereby incorporated by reference.

BACKGROUND OF THE INVENTION

1. Field of the Invention

The present invention relates to an Internet Protocol TeleVision (IPTV) receiver, and more particularly, to a method for performing a Personal Video Recorder (PVR) function through a widget application in the IPTV receiver.

2. Discussion of the Related Art

Conventional broadcast receivers received broadcast signals from a broadcasting medium, such as terrestrial, satellite, and cable, thereby providing the broadcast signals to users. Recently, however, IPTV services enabling the reception and transmission of broadcast signals in IP packets via internet protocol (IP) are being actively provided. Unlike other broadcasting media, such IPTV services are free from all geographical limitations. More specifically, once a user is connected to an internet protocol (IP), the user may be provided with the requested IPTV services.

However, the conventional broadcast receiver is limited to an existing PVR function, without configuring its unique PVR filter. Moreover, a transmitter has no way to control contents in relation to the PVR operation of the receiver.

SUMMARY OF THE INVENTION

Accordingly, the present invention is directed to an Internet Protocol TeleVision (IPTV) receiver and a method for performing a Personal Video Recorder (PVR) function in the IPTV receiver that substantially obviates one or more problems due to limitations and disadvantages of the related art.

An object of the present invention is to provide common Application Programming Interfaces (APIs) that allow the IPTV receiver to record and manage contents using an installable application such as a widget application.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method includes downloading a widget application from a server, receiving a first request for executing the downloaded widget application from a user, executing the downloaded widget application according to the first request at a browser, receiving a second request for performing a specific PVR function through the executed widget application from the user and performing the specific PVR function according to the second request.

At this time, the method may further comprise accessing the server, transmitting a receiver profile to the accessed server and receiving a available widget application list from the accessed server based upon the transmitted receiver profile.

The receiver profile may include a PVR element for an available PVR function corresponding to the IPTV receiver.

The PVR element may include any one of a playback control element, a stream editor element, a content manager element, and a time-shift element.

The PVR element may further include a bookmark element.

The IPTV receiver may store Application Programming Interfaces (APIs) corresponding to the PVR elements.

The downloaded widget application may control the IPTV receiver to perform the PVR function according to the second request by calling the APIs.

The method may further comprise storing a user profile including a user's setting on the downloaded widget application and transmitting the stored user profile to the server.

The playback control element may include an element performing a function related to playing a stored content, stopping to play the stored content, a playing speed and a playing location.

The playback control element may include an element performing a function related to recording at least one of contents, the recording including any one of an instant recording, a prescheduled recording, and a time-shift.

In another aspect of the present invention, an IPTV receiver includes a storage unit, a first receiving unit for downloading a widget application from a server, a second receiving unit for receiving a first request executing the downloaded widget application from a user, and a second request performing a specific PVR function through the executed widget application from the user, a controller for controlling the downloaded widget application to execute at a browser according to the received first request and the specific PVR function to be performed according to the second request and the browser for being executed the downloaded widget application.

The controller may control a receiver profile to transmit to the server, the receiver profile including a PVR element on available PVR functions in the IPTV receiver.

The first receiving unit may receive an available widget application list from the server based upon the transmitted receiver profile in the IPTV receiver.

The PVR element may include any one of a playback control element, a stream editor element, a content manager element, and a time-shift element.

The PVR element may further include a bookmark element.

The storage unit may store an Application Programming Interfaces (APIs) corresponding to the PVR elements.

The widget application may control the controller to perform the specific PVR function according to the second request by calling the API from the storage unit.

The controller may control a user profile to store a user's setting on the widget application and the stored profile to transmit to the server.

The playback control element may include an element performing a function related to playing a stored content, stopping to play the stored content, a playing speed and a playing location.

The playback control element may include an element performing a function related to recording at least one of contents, the recording including any one of an instant recording, a prescheduled recording, and a time-shift.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates a diagram showing an XML schema of FIG. 5;

FIG. 9 and FIG. 10 illustrate a diagram showing an XML schema of FIG. 8;

FIG. 12 illustrates a diagram showing an XML schema of FIG. 11;

FIG. 14 illustrates a diagram showing an XML schema of FIG. 13;

DETAILED DESCRIPTION OF THE INVENTION

Figure 1:
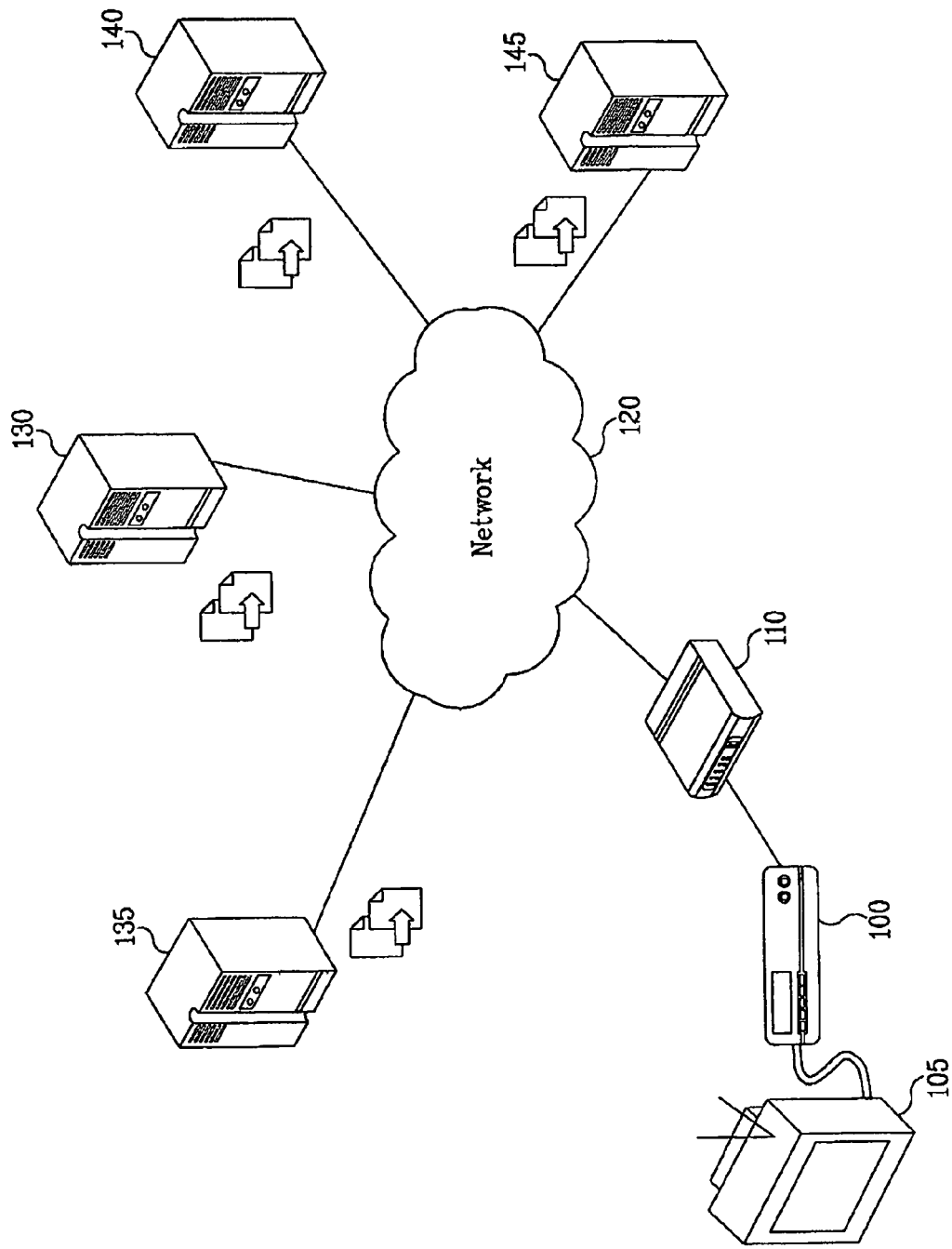
FIG. 1 illustrates a general view describing an IPTV environment that can provide a widget service according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Hereinafter, preferred embodiments of the IPTV receiver and method for controlling an application in the IPTV receiver according to the present invention will now be described in detail with reference to the following drawings. Hereinafter, in the description of the present invention, the term "PVR widget application" refers to a widget application that is one of applications deployed in an IPTV environment, particularly a widget application for performing a PVR function.

Also, in the description of the present invention, a method for controlling a PVR function through a PVR widget application in an IPTV environment will hereinafter be described in detail. Herein, the control of the PVR function refers to using the PVR widget application to perform a PVR function to a video content, so as to perform diverse functions of the PVR with respect to a series of video contents. Also, the description of the present invention provides a standardized framework enabling a widget application, such as the PVR widget application of the present invention, to be executed in all IPTV receivers, i.e., in an IPTV terminal function (ITF). This is because, in an IPTV environment, the ITF has different hardware and operation system (OS) environment (or condition).

Therefore, according to the present invention, the ITF can provide PVR function through a PVR widget application. That is, the PVR widget application provides PVR recording and play (or reproduce) functions according to the present invention. Also, common Application Programming Interfaces (APIs) are internally preserved in the IPTV receiver so that a user may selectively download and install a plurality of widget applications with various functions. Further, the PVR widget application may provide the user with a trick play function, a scheduled recording function, and a function of editing recorded contents or extracting images from the recorded contents.

Also, in the perspective of the content provider, the PVR filter may be easily transmitted to the IPTV receiver, thereby enabling special effects to be applied to the corresponding IPTV receiver. Also, for the convenience in searching and selecting the above-described PVR filter, the present invention may provide a widget application. Also, in the present invention, a list of PVR filters applicable to video contents or a receiver profile is managed. And, detailed information may be transmitted to the service provider or the contents provider, so as to be used in the searching of PVR filters. Furthermore, according to the present invention, when a PVR function is set-up, the widget application uses Broadband Content Guide (BCG) information or category information of a Content on Demand (CoD) Extensible Markup Language (XML) schema, so as to be automatically set-up. Thereafter, configuration information on the widget application for each user (i.e., user profile) is stored so as to be managed by the IPTV service provider, thereby enabling the user to use his (or her) own unique widget application at any location provided with IP connection.

FIG. 1 illustrates a general view describing an IPTV environment that ca provide a Widget service according to the present invention.

Referring to FIG. 1, in an IPTV environment, a widget service is serviced from a server to a receiver through a network 120. The server may include a contents provider 130, a receiver manufacturer (or consumer manufacturer) server 135, and service providers, such as Widget service providers 140 and 145. Herein, the contents provider 130 manufactures contents included in an IPTV service. The receiver may include an IPTV receiver 100, a display device 105, and a delivery network gateway (DNG) 110. The display device 105 outputs the IPTV service received through the IPTV receiver 100. The delivery network gateway (DNG) 110 helps the IPTV receiver 100 to access the Internet. Herein, the network 120 may correspond to an open Internet (or unmanaged network) or a managed network.

Referring to FIG. 1, as an example, the widget service is described to be provided to widget service providers 140 and 145, which correspond to a type of service provider. Therefore, the widget service may also be provided through a content provider 130 or a receiver manufacturer (or consumer manufacturer) server 135. Hereinafter, according to the present invention, a PVR widget application will be given as an example of the widget service. However, this is merely exemplary, and, therefore, a widget application performing other functions may also be included herein.

Figure 2:
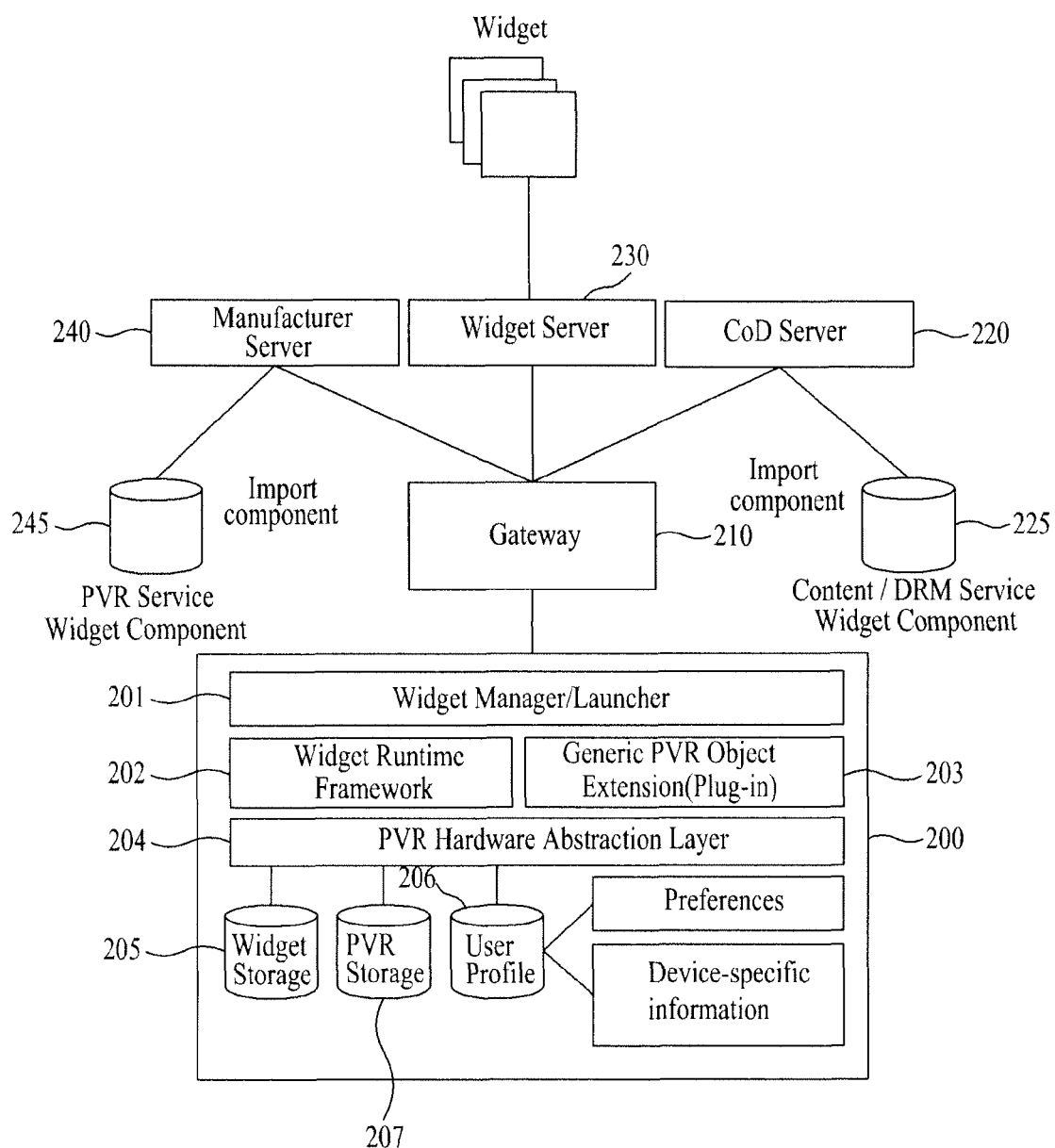
FIG. 2 illustrates an exemplary diagram for specifying a deployment process of a widget application in an IPTV environment according to the present invention.

FIG. 2 is a diagram illustrating an exemplary deployment of a widget application between a server and an IPTV receiver in an IPTV environment.

Referring to FIG. 2, a server transmits a widget service to an accessible ITF 200 via a gateway 210.

The server may include a Content on Demand (CoD) server 220, a widget server 230, and a manufacturer server 240. The CoD server 220 provides CoD services and includes a database in which contents/Digital Rights Management (DRM) service widget components are stored. The manufacturer server 240 is a server of a manufacturer that manufactured the ITF, for example, including a database in which PVR service widget components suitable for ITFs manufactured by the manufacturer are stored. The widget server 230 is a service provider that provides a PVR widget application. The widget server 230 may produce and provide a PVR widget application or it may receive and service a PVR widget application. The CoD server 220 and the manufacturer server 240 may import PVR widget application components from their databases to the ITF 200 via the gateway 210.

The ITF 200 may include modules required for executing widget applications, a widget storage 205 for storing the widget applications, a user profile storage 206 and a PVR storage 207. In FIG. 2, the modules required for executing widget applications in the ITF 200 may include a widget manager/launcher 201, a widget runtime framework module 202, and a generic PVR object extension (plug-in) module 203. The widget storage 205, a PVR storage 207, and the user profile storage 206 are dependent on a PVR hardware abstraction layer 204. It is to be noted herein that the ITF configuration illustrated in FIG. 2 is an exemplary minimum configuration required for performing a widget application operation, to which the present invention is not limited.

The widget manager/launcher 201 may install and manage a widget application received via the gateway 210 and launch the installed widget application in accordance with a user profile 206.

The manufacturer server 240 may generate device-specific information such as a widget application that controls detailed hardware operations of an ITF or PVR-related components and distribute the device-specific information, for interaction with another 3rd-party widget application. Thus the ITF 200 may receive and store the device-specific information in the user profile storage 206.

The ITF 200 may download and install a widget application and identify a widget application that is installable in the ITF 200 using hardware profiles of the IPTV, that is, a receiver profile and/or the user profile.

Figure 3:
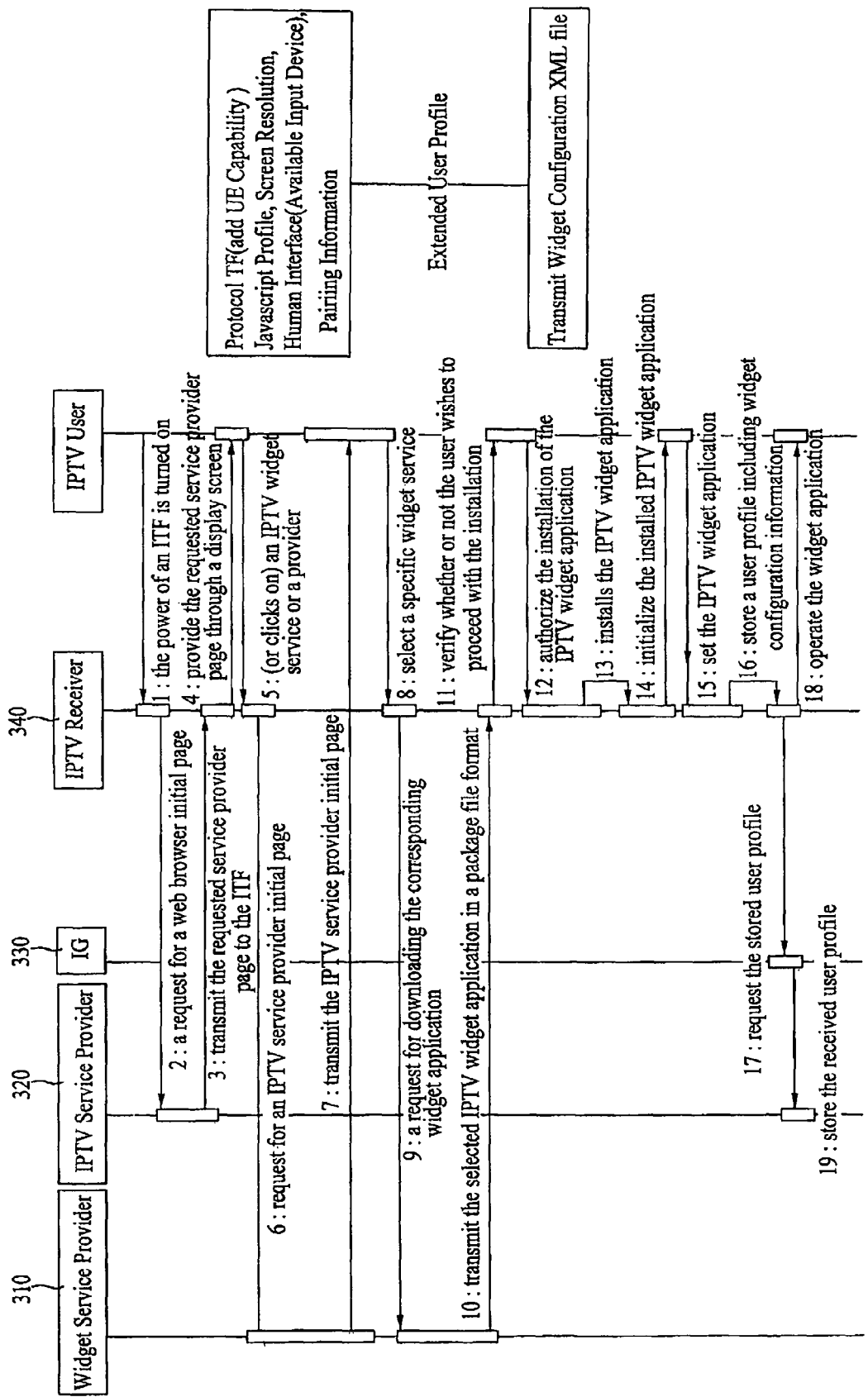
FIG. 3 illustrates an exemplary diagram for specifying a process of providing a widget service in an IPTV service provider according to the present invention.

FIG. 3 illustrates an exemplary diagram for specifying a process of providing a Widget service in an IPTV service provider according to the present invention.

Herein, in an IPTV environment, a widget service provider 310, an IPTV service provider 320, a gateway 330, and an IPTV receiver 340 may be involved in the widget servicing process (or the process of providing the widget service). However, the present invention will not be limited only to the example shown in FIG. 3. Therefore, a separate structure associated with the provision of a widget service may be further included in the IPTV environment, or, conversely, part of the structure may be omitted or a specific structure may be replaced with a different structure. For example, in FIG. 3, the widget service provider 310 and the IPTV service provider 320 may correspond to the same entity.

If the power of an IPTV receiver 340 is turned on by the user (STEP 1), the IPTV receiver 340 sends a request for a web browser initial page to the IPTV service provider 320 (STEP 2). Thereafter, the IPTV receiver 340 receives the requested service provider page from the IPTV service provider 320 (STEP 3).

The IPTV receiver 340 provides the requested service provider page received from the IPTV service provider 320 to the user through a display screen (STEP 4). Also, the IPTV service provider 320 may correspond to the same entity as an IPTV service profile Functional Entity (FE). Moreover, the IPTV service provider 320 may correspond to the IPTV service provider determined by default setting by the IPTV receiver 340.

When the user selects (or clicks on) an IPTV widget service or a provider from the initial page provided through the display screen (STEP 5), the IPTV receiver 340 accesses the widget service provider 310 and requests for an IPTV service provider initial page (STEP 6). According to the request, the widget service provider 310 transmits the IPTV service provider initial page to the IPTV receiver 340, and the ITF 340 provides the received IPTV service provider initial page to the user through the display screen (STEP 7). Herein, the widget service provider 310 may correspond to the same entity as an IPTV application FE. Also, as described above, when the user selects (or clicks on) an IPTV widget service or a provider, and when the corresponding initial page is requested, the IPTV receiver 340 may transmit the profile of the IPTV receiver 340 (i.e., receiver profile) to the widget service provider 310 in accordance with the related protocol along with the request.

When the user selects a specific widget service (STEP 8), the IPTV receiver 340 sends a request for downloading the corresponding widget application to the widget service provider 310, which provides the selected widget service (STEP 9). Based upon the download request received from the IPTV receiver 340, the widget service provider 310 transmits the selected IPTV widget application in a package file format (STEP 10). During this process, the user may search a widget application fro the IPTV widget service page displayed on the display screen of the IPTV receiver 340. More specifically, the user may search for a widget application suitable for a user equipment class (UE) capacity.

In relation to the IPTV widget application within the package received from the widget service provider 310, the IPTV receiver 340 may verify whether or not the user wishes to proceed with the installation through an on-screen display (OSD) (STEP 11). Based upon the verified result, if the user wishes to install the application, the IPTV receiver 340 authorizes the installation of the IPTV widget application within the received package (STEP 12).

If the authorization is transmitted by the user, the IPTV receiver 340 installs the IPTV widget application included in the received package (STEP 13). Subsequently, the IPTV receiver 340 initializes the installed IPTV widget application (STEP 14) and provides the installed and initialized IPTV widget application to the user. Thereafter, the IPTV receiver 340 receives the IPTV widget application settings from the user (STEP 15).

The IPTV receiver 340 stores a user profile including widget configuration information set-up by the user in relation with the installed IPTV widget application (STEP 16). Then, the IPTV receiver 340 requests the stored user profile to pass through the gateway 330 and stored in the IPTV service provider 320 (STEP 17). Accordingly, the IPTV service provider 320 stores the received user profile (STEP 19). During this process, the IPTV receiver 340 may operate the widget application in which the user settings have been applied (STEP 18). In the example given in FIG. 3, the user profile is stored in the IPTV service provider 320. However, this is merely exemplary. Accordingly, in another example, the user profile may be alternatively stored in the widget service provider 310. The user profile may be differentiated according to each user by the server 310 and/or 320, thereby being stored in the respective database. Therefore, the user may access the server at any time and any place and call his (or her) own user profile information, thereby being able to use his (or her) own unique widget application from an IPTV receiver different from his (or her) own IPTV receiver.

Hereinafter, the receiver profile and the user profile of FIG. 3 will be described in more detail with reference to FIG. 4, FIG. 5, and FIG. 6.

Figure 4:
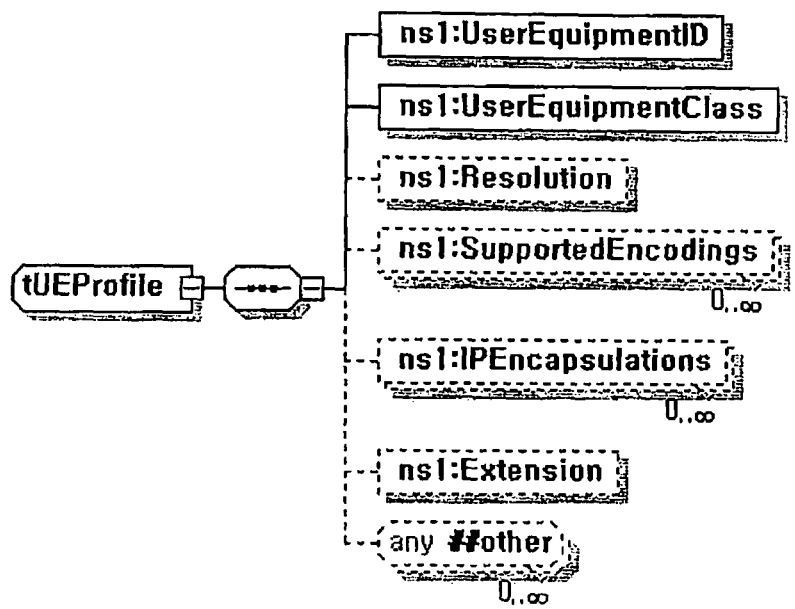
FIG. 4 illustrates a schematic diagram of a receiver profile configured according to a first embodiment of the present invention.

FIG. 4 illustrates a schematic diagram of a receiver profile configured according to a first embodiment of the present invention. FIG. 5 illustrates a schematic diagram of a receiver profile configured according to a second embodiment of the present invention. And, FIG. 6 illustrates a diagram showing an XML schema of FIG. 5.

By searching/browsing a widget application and by transmitting information associated to execution conditions (or environment) of the widget application, such as IPTV receiver functions, available resource amount (or size), and so on, to the server in order to download the searched widget application, the IPTV receiver may be capable of optionally downloading the adequate widget application.

Hereinafter, the above-described receiver profile transmitted from the IPTV receiver will be specified as follows.

Referring to FIG. 4, the user profile includes a UserEquipmentID element, a UserEquipmentClass element, a Resolution element, a SupportedEncodings element, an IPEncapsulations element, and an Extension element.

The UserEquipmentID element includes a model Unique Identifier (UID) of the corresponding IPTV receiver. The Resolution element includes video resolution information of the corresponding IPTV receiver. And, the SupportedEncodings element includes information on the PVR function of the corresponding IPTV receiver.

Figure 5:
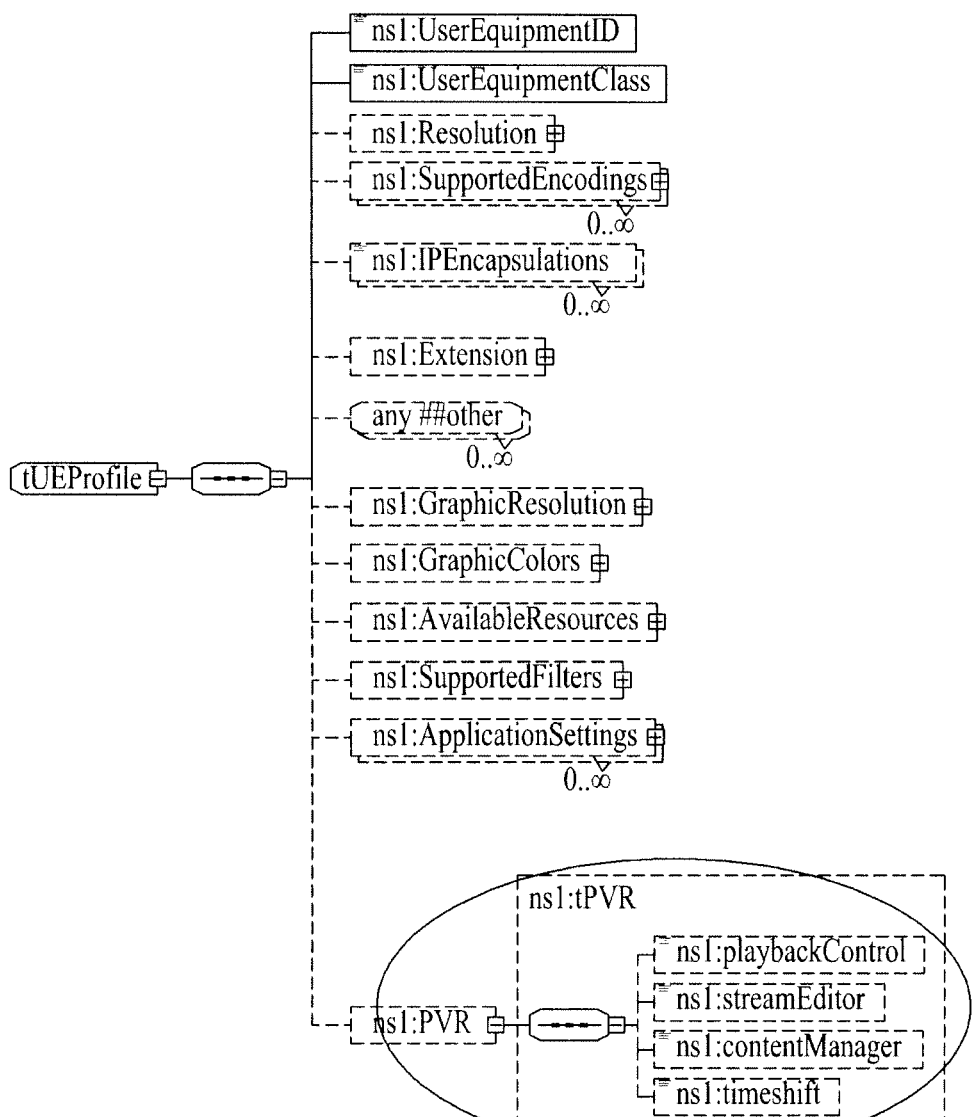
FIG. 5 illustrates a schematic diagram of a receiver profile configured according to a second embodiment of the present invention.

The receiver profile of FIG. 5 further includes a Graphic Resolution element, a Graphic colors element, an Available Resources element, and a PVR element in addition to the receiver profile shown in FIG. 4.

Referring to FIG. 5 and FIG. 6, the Graphic colors element is defined as a tGraphicColor Type and includes information indicating the processing ability of the IPTV receiver on the graphic color. Herein, the graphic color refers to a bit-depth of each pixel, when graphic data are rendered to the OSD. The tGraphicColor Type can be defined based on a color depth attribute. Any one value of 32 bpp, 24 bpp, 16 bpp, and 8 bpp may be given as an enumeration value of the color depth attribute.

The Graphic Resolution element is defined as a tGraphicResolution Type and includes information indicating the processing ability of the IPTV receiver on the graphic resolution. Herein, the graphic resolution refers to a resolution of OSD graphic that can be used by the widget application. The tGraphicResolution Type can be defined based on a horizontal size attribute, a vertical size attribute, and a rotation attribute.

The Available Resources element is defined as a tAvailableResolution Type and includes information indicating the available resource amount for the widget application. Herein, the resource amount refers to a non-volatile memory and a volatile memory.

The PVR element is defined as a tPVR Type and includes information indicating a function, among many PVR functions, that can be executed by the user equipment. Therefore, among the PVR functions described in the present invention, the user equipment may transmit executable filters to the server, thereby being able to download and use only the PVR widget application that can be used by the user equipment. Herein, the PVR element may include playback control element, stream editor element, content manager element, timeshift element, and so on.

Figure 7:
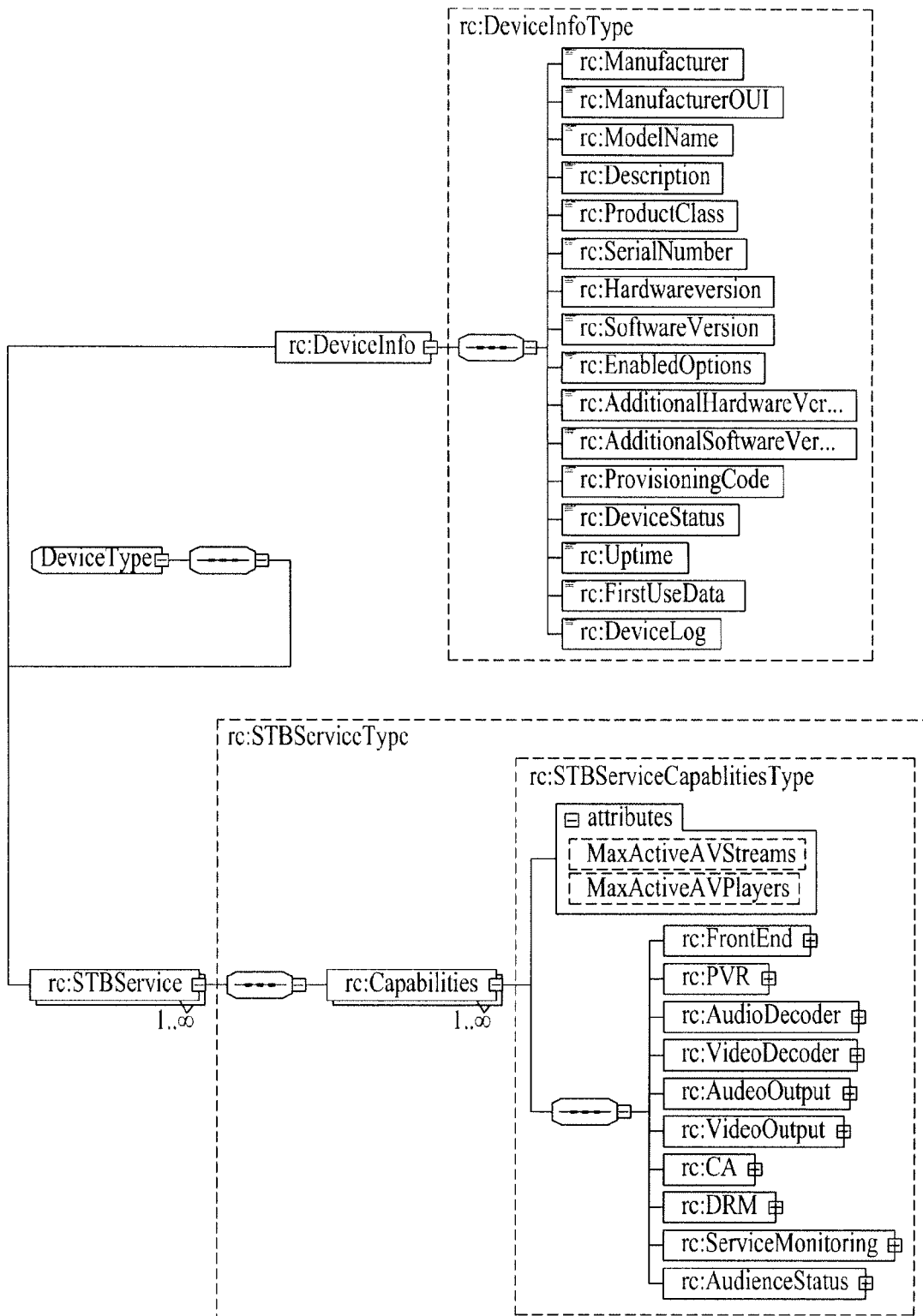
FIG. 7 illustrates a schematic diagram of a receiver profile configured according to a third embodiment of the present invention.

FIG. 7 illustrates a schematic diagram of a receiver profile configured according to a third embodiment of the present invention.

The receiver profile according to the third embodiment of the present invention includes information related to receiver capabilities. Such information related to receiver capabilities (or performance) is largely divided into a DeviceInfo element, which is defined as a DeviceInfo Type, and a STBService element, which is defined as a STBService Type.

The DeviceInfo element may include a Manufacturer element, a Manufacturer OUI element, a Model Name element, a description element, a productclass element, a serial number element, a hardware version element, a software version element, an enabled options element, an additional hardware version element, an additional software version element, a provisioning element, a device status element, an Uptime element, a first use data element, and a device log element.

The STBService element may include a FrontEnd element, a PVR element, an AudioDecoder element, a VideoDecoder element, an AudioOutput element, a VideoOutput element, a Conditional Access (CA) element, a Digital Rights Management (DRM) element, a ServiceMonitoring element, and an AudienceStatus element. Also, attributes of the STBService element may be a MaxActiveAVStreams attribute and a MaxActiveAVPlayers attribute.

Figure 8:
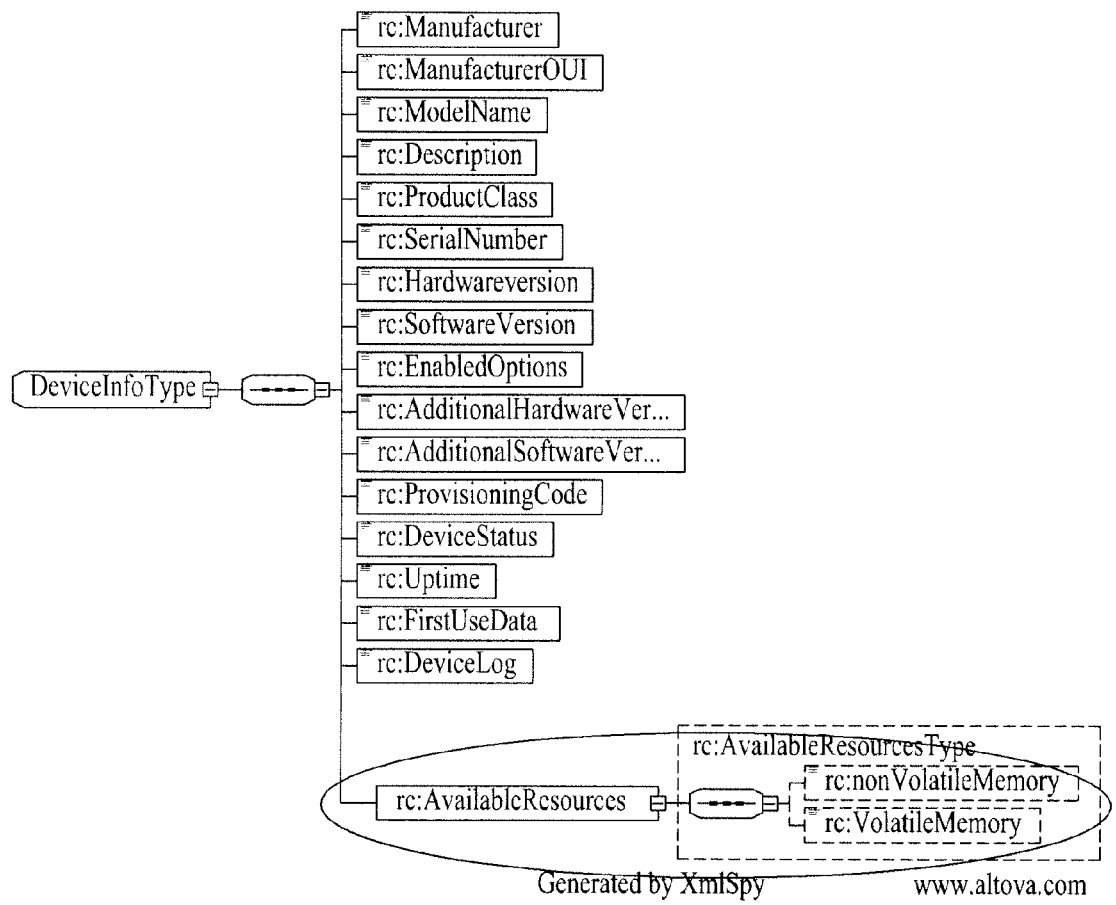
FIG. 8 illustrates a schematic diagram of a receiver profile configured according to a fourth embodiment of the present invention.

FIG. 8 illustrates a schematic diagram of a receiver profile configured according to a fourth embodiment of the present invention. And, FIG. 9 and FIG. 10 illustrate a diagram showing an XML schema of FIG. 8.

In FIG. 8, the DeviceInfo element of FIG. 7 further includes an AvailableResources element on available resource information for executing the widget application.

The AvailableResouces element may include a non-VolatileMemory element and a VolatileMemory element.

Referring to the FIG. 9 and FIG. 10, sub-elements of the DeviceInfo element is specified as follows.

The DeviceInfo element is defined as a type of an object, wherein the object contains general device information. The Manufacturer element is defined as a type of string (64) and descriptive of a manufacturer of the CPE (human readable string). The ManufacturerOUI element is defined as a type of string (6) and descriptive of structurally unique identifier of the device manufacturer. The Model Name element is defined as a type of string (64) and descriptive of a model name of the CPE (human readable string). The description element is defined as a type of string (256) and descriptive of a full description of the CPE device (human readable string). The productclass element is defined as a type of string (64) and descriptive of an identifier of the class of product to which the serial number applies. In other words, for a given manufacturer, this parameter is used to identify the product or class of for product for which the SerialNumber parameter is unique. The serial number element is defined as a type of string (64) and descriptive of a serial number of the CPE.

The hardware version element is defined as a type of string (64) and descriptive of a string identifying the particular CPE model and version. The software version element is defined as a type of string (64) and descriptive of a string identifying the software version currently installed in the CPE. The enabled options element is defined as a type of string (1024) and descriptive of a comma-separated list (maximum length 1024) of strings. The Comma-separated list corresponds to a list of the OptionName for each Option that is currently enabled in the CPE. The OptionName for each option is identical to the OptionName element of the OptionStruct. Only these options are listed, wherein the respective State indicates that the corresponding option is enabled. The additional hardware version element is defined as a type of string (64) and descriptive of a comma-separated list (maximum length 64) of strings. The comma-separated list of any additional version represents any additional hardware version information a vendor may wish to supply. The additional software version element is defined as a type of string (64) and descriptive of a comma-separated list (maximum length 64) of strings. The comma-separated list of any additional version represents any additional software version information the vendor may wish to supply.

The provisioning element is defined as a type of string (64) and descriptive of an identifier of the primary service provider and other provisioning information, so as to determine service provider-specific customization and provisioning parameters. The device status element is defined as a type of string (64) and descriptive of a current operational status of the device. The current operational status corresponds to any one of 'up', 'initializing', 'error', and 'disabled'. The Uptime element is defined as a type of unsignedInt and descriptive of the time in seconds since the CPE was last restarted. The first use data element is defined as a type of dateTime and descriptive of a date and time in Universal Time Coordinated (UTC) that the CPE first successfully established an IP-layer network connection and acquired an absolute time reference using NTP or equivalent over the network connection. The CPE may reset this date after a factory reset. If NTP or equivalent is not available, this parameter, if present, should be set to an Unknown Time value. The device log element is defined as a type of string (32768) and descriptive of a vendor-specific log(s).

The nonVolatileMemory element is defined as a type of unsignedInt and descriptive of the amount (or size) of an available non-volatile memory. The VolatileMemory element is defined as a type of unsignedInt and descriptive of the amount (or size) of an available volatile memory.

Figure 11:
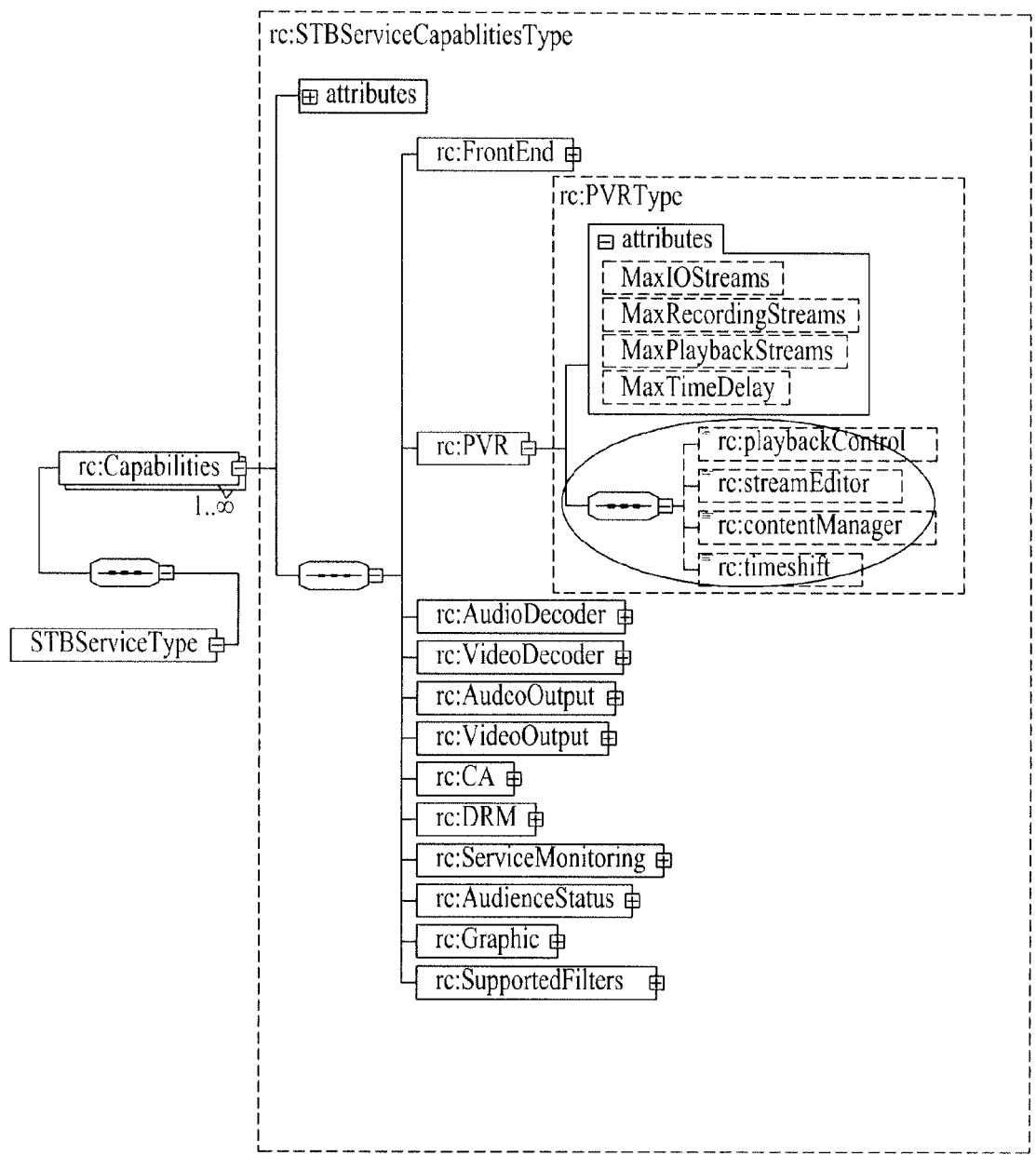
FIG. 11 illustrates a schematic diagram of a receiver profile configured according to a fifth embodiment of the present invention.

FIG. 11 illustrates a schematic diagram of a receiver profile configured according to a fifth embodiment of the present invention. And, FIG. 12 illustrates a diagram showing an XML schema of FIG. 11.

In FIG. 11, the STBService element of FIG. 7 further includes a Graphic element for describing (or specifying) OSD graphic functions of a set-top, and a PVR element for specifying a supportable PVR function. The Graphic element may include a GraphiResolution element and a GraphicColor element.

Referring to the FIG. 12, sub-elements of the STBService element are specified as follows.

The FrontEnd element is descriptive of a function of the front end, which acts as an interface between the network and the inner functional blocks of the STB. The PVR element is descriptive of a function of the PVR, which stores programs coming (or delivered) from any Front End and sends stored programs to audio and/or video decoders or to the (output) IP front end. The AudioDecoder element is descriptive of a function of the audio decoder, which receives an elementary audio stream, decodes the audio, and outputs an uncompressed native audio stream to an audio output object. The VideoDecoder element is descriptive of a function of the video decoder, which receives an elementary video stream, decodes the video, and outputs an uncompressed native video stream to a video output object. The AudioOutput element is descriptive of a function of the audio output, which receives uncompressed audio streams from one or more audio decoders and performs format adaptations. The VideoOutput element is descriptive of a function of the video output, which receives uncompressed video streams from one or more video decoders, and performs format adaptations. The CA element is descriptive of a function of the CA component, which contains details of one of the CA mechanisms that may be supported by the STB. The DRM element is descriptive of a function of the DRM component, which contains details of one of the DRM mechanisms that may be supported by the STB. The ServiceMonitoring element is descriptive of a service monitoring statistics, which are collected based upon service types. The main reason for defining service types is that the service types correspond to different protocol stacks and configurations, and statistics collected across multiple service types would be meaningless. The AudienceStatus element is descriptive of a statistics, which contains audience viewing statistics, organized by channels.

Furthermore, since the Graphic element further included in FIG. 11 and FIG. 12 are identical to those shown in FIG. 5, detailed description of the same will be omitted for simplicity.

Further to FIG. 5 and FIG. 6, the PVR element in FIG. 11 and FIG. 12 further includes a plurality of attributes such as MaxIOStreams attribute, MaxRecordingStreams attribute, MaxPlaybackStreams attribute, MaxTimeDelay attribute, and so on. Herein, the MaxIOStreams attribute and the MaxRecordingStreams attribute can represent maximum number of AV streams that the PVR can simultaneously record. The MaxPlaybackStreams attribute can represent maximum number of AV streams that the PVR can simultaneously play back. And, the MaxTimeDelay attribute can represent maximum time delay, in seconds, that the PVR time-shift mode can support. Each attribute can indicate no specific limit on the number of streams or time delay according to a value of corresponding attribute. Accordingly, the IPTV receiver can store a plurality of streams (or contents). Also, the storing can be simultaneously performed. Each stream may be stored different area in a memory. Or one stream may be stored in a network (e.g., a widget server or IPTV service provider), others stream may be stored in the memory.

The above-description consists of details on the receiver profile of the IPTV receiver. Hereinafter, the user profile will now be described in detail. In the following description, when the user uses a PVR widget application according to the present invention for the respective video content in order to perform the PVR function, the user profile may include all content modified according to the user settings made during this process (e.g., settings that change values of particular functions).

Figure 13:
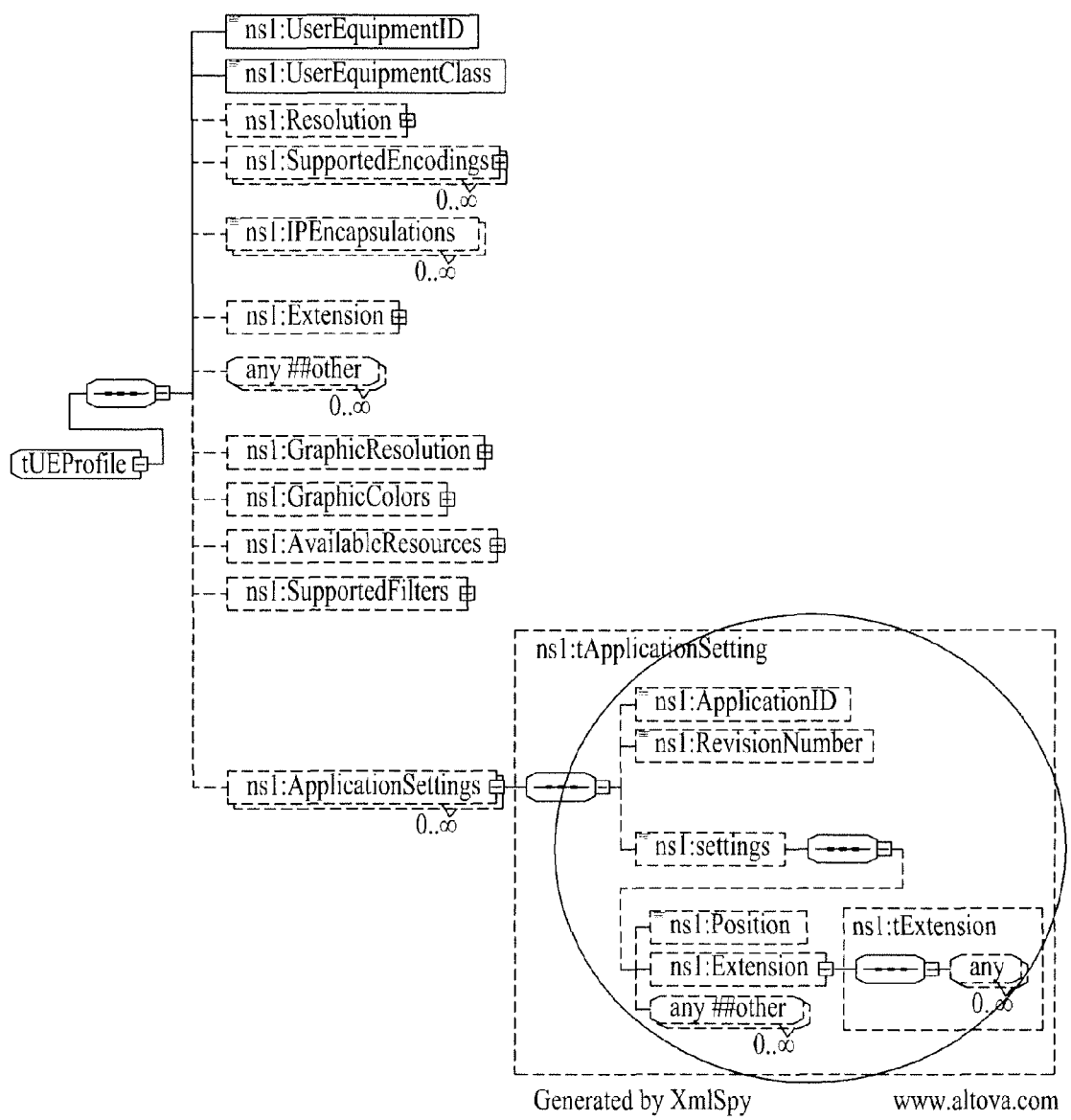
FIG. 13 illustrates a schematic diagram of a user profile configured according to an embodiment of the present invention.

FIG. 13 illustrates a schematic diagram of a user profile configured according to an embodiment of the present invention. And, FIG. 14 illustrates a diagram showing an XML schema of FIG. 13.

FIG. 13 and FIG. 14 illustrate a UE profile. The UE profile manages information on widget applications that have been installed for each IPTV receiver and the respective environment settings as the user's profile. Accordingly, the UE profile enable the user to use his (or her) own settings without any modification even when the user accesses a related service through any terminal (or user equipment) other than his (or her) own user equipment.

Hereinafter, among the elements included in the user profile, detailed description of the elements that are identical to those included in the receiver profile will be omitted for simplicity. Accordingly, only the elements that are newly introduced will be described in detail. Referring to FIG. 13 and FIG. 14, unlike the receiver profile, the user profile includes an ApplicationSettings element. The ApplicationSettings element may include an ApplicationID element, a RevisionNumber element, and a Settings element. The ApplicationID element corresponds to an element respective to an identifier that can uniquely identify each widget application. The RevisionNumber element corresponds to an element that indicates the version of each widget application. Therefore, the ApplicationID and version information for each widget application are stored in the user profile, thereby being able to call upon a specific widget application. Furthermore, the Settings element corresponds to an element that stores user-specific set-up information for each widget application. Herein, the Settings element includes a Position element, an Extension element, and other elements. More specifically, the Position element indicates position information of each widget application within the overall list of widget applications. And, the Extension element and other elements indicate information on environment settings for each widget application. Accordingly, by storing the widget application installed in each IPTV receiver and the information on the environment settings for each widget application in the server through the user profile information, the user may be able to easily use the same environment even when using a related service through any random IPTV receiver.

Figure 15:
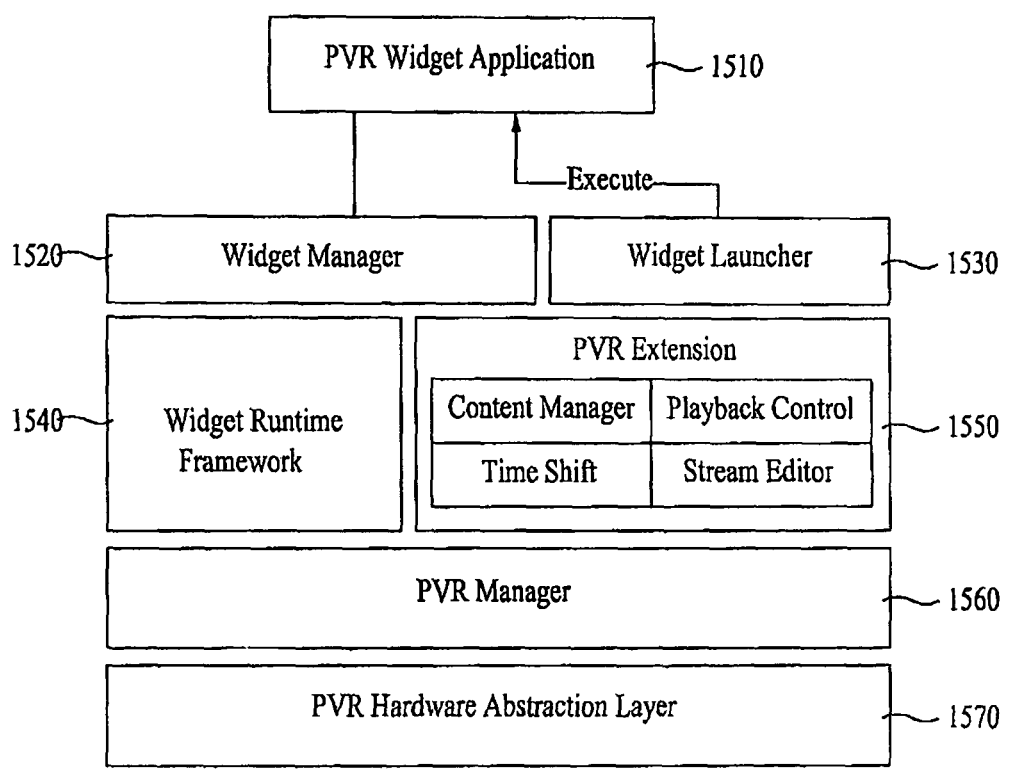
FIG. 15 illustrates a relationship between a PVR widget extension module and IPTV software according to the present invention.

FIG. 15 illustrates the relationship between a PVR widget extension module and IPTV software according to the present invention.

In FIG. 15, the description of FIG. 2 is referred to for a widget manager 1520 and a widget launcher 1530, a detailed description of which is not provided herein.

Upon power-on of an IPTV receiver, a widget runtime framework module 1540 provides an environment in which the user can execute and use a PVR widget application 1510.

The PVR extension module 1550 operates such that a user-requested function is performed through the PVR widget application 1510.

To perform the user-requested function by the PVR widget application 1510 through the widget runtime framework module 1540 or the PVR extension module 1550, a PVR manager 1560 controls the operation of each hardware device related to the function.

To be more specific, upon power-on of the IPTV receiver, the widget runtime framework module 1540 sets an environment in which the PVR widget application 1510 can be deployed. When the PVR widget application 1510 runs and the user requests a specific function through the PVR widget application 1510, the PVR widget application 1510 calls an API that is defined as described later in relation to the requested function.

Therefore, the widget runtime framework module 1540 notifies the PVR extension 1550 module of the call of the API, if the called API is related to a PVR function. Then the PVR extension module 1550 identifies the notified API and notifies the PVR manager 1560 that a function corresponding to the API has been requested. The PVR manager 1560 receives the user request from the PVR extension module 1550 and controls associated modules to operate. When needed, a value corresponding to an initial user request may be returned in a reverse path of the above-described procedure.

In this manner, the user may perform the PVR function simply through the PVR widget application 1510.

Now a description will be made of APIs for controlling PVR functions available to the IPTV receiver. These APIs are referred to as PVR APIs.

Table 1 below defines an example of PVR APIs according to the present invention. With reference to Table 1, the PVR APIs will be described in detail.

TABLE 1

| Category | PVR Extension APIs | Description |
|---|---|---|
| Playback Control APIs | Play | Play stored content |
| | Stop | Stop playing of content |
| | Pause | Temporarily stop on-going operation |
| | Resume | Resume stopped operation |
| | SlowMotion | Play content in slow motions |
| | FastForward | Play content in FF mode |
| | FastRewind | Play content in fast REW mode |
| | Speed | Play content at input play multiple speed |
| | FrameForward | Play content in units of frames |
| | FrameRewind | Rewind content in units of frames |
| | Jump | Move to target positions |

TABLE 1-continued

| Category | PVR Extension APIs | Description |
| --- | --- | --- |
| | StartJump | Play content after moving to target position |
| | FinishiJump | Stop playing after moving to target position |
| | Replay | Replay video and audio of set area |
| | Skip | Play content, skipping |
| | Record | Record content |
| | RecordScheduledProgram | Record scheduled program. Information to be subjected to scheduled recording is transmitted |
| Stream Editor APIs | SetEditStartPosition | Set start position of area to be edited |
| | SetEditEndPosision | Set end position of area to be edited |
| | CancelEditSection | Cancel area to be edited |
| | IsEditSectionFixed | Return information indicating whether an area to be edited is completely set |
| | DeleteEditInformation | Delete all of edit information |
| | SetRepeatStartPosition | Set start position for iterative play |
| | SetRepearEndPosition | Set end position for iterative play |
| | IsRepeatSectionFixed | Return information indicating whether iterative play setting is completed |
| | DeleteRepeat | Delete iterative play area |
| | SetBookmark | Bookmark selected area |
| | RemoveBookmark | Delete bookmarked area |
| | GetFavoriteList | Get favorite information set so far |
| | RegisterFavorite | Register bookmarked area in favorite list |
| | UnregisterFavorite | Remove bookmarked area from favorite list |
| | SetRateOfFacvorite | Set rating for each favorite |
| | OpenFavoriteList | Plural favorite lists may be available. They may be opened in different files |
| | LoadFacoriteList | Load favorite list file |
| | CloseFavoriteList | Close favorite list file |
| Content Manager APIs | Copy | Copy stored content to designated output device |
| | Move | Move stored content to designated output device. After the movement, the content is deleted irrevocably in device that has executed this command |
| | Remove | Delete stored content from current device |
| | SetOutputInterface | Set output device to which content is to be copied or moved |
| | SetInputInterface | Set input device when content is copied or moved |
| | Stop | Cancel current operation |
| | GetOutputInterface | Confirm current designated output device |
| | GetInputInterface | Confirm current designated input device |
| | GetStatus | If progress status information is returned during movement, copy, or deletion, Widget may display this information |
| Time-Shift APIs | Initialize | Initialize Timeshift object. Initialize memory or set hardware to timeshift-enabled state |
| | Finalize | Finalize Timeshift object. Finalize memory use or hardware use |
| | StartTimeshift | Start Timeshift |
| | StopTimeshift | Stop Timeshift |
| | ResumeTimeshift | Resume Timeshift |
| | Play | Play during timeshift |

TABLE 1-continued

| Category | PVR Extension APIs | Description |
|---|---|---|
| | Stop | Stop timeshift play |
| | GetstartPointOfTimeshift | Return to start point of Timeshift |
| | SetStartPointOfTimeshift | Set some point of Timeshift as start point |
| | GetCurrentSizeOfAvailableTimeshift | Return current available capacity for Timeshift |
| | GetTimeshiftStatus | DVR Widget Application invokes this API to check current Timeshift status, mainly to display timeshift available time or progressed time |
| | NotifyTimeshiftStatus | Function to report current timeshift status to DVR Widget Application |

Referring to Table 1, the PVR APIs are categorized into Playback Control APIs, Stream Editor APIs, Content Manager APIs, and Time-Shift APIs. While the PVR APIs are classified according to their functions so that APIs that function similarly fall into the same category in Table 1, Table 1 should not be construed as limiting the present invention. For instance, APIs with bookmark-related functions (i.e., Bookmark APIs) are classified as Stream Editor APIs. Yet, these APIs may belong to another category (e.g., Playback Control) or they may form an independent category.

Each of the above API categories may serve one individual PVR widget application, two or more of the above API categories may serve one PVR widget application, or all of the above API categories may serve one PVR widget application. In other words, the API categories or the PVR APIs may be configured in many combinations to implement a PVR widget application.

The exemplary APIs listed in Table 1 may be configured individually, two or more of the APIs may be configured as a single set, or a specific API may be dependent on another API.

Hereinbelow, a detailed description will be made of the PVR APIs according to the present invention, for the convenience' sake of description, by API category.

The Playback Control APIs are given as follows. The user may control playback of a video content using a PVR widget application. The APIs described below are involved between the IPTV receiver and the PVR widget application in relation to a user request for playing back a video content.

The Play API is used to play a video content. Although the Play API is used generally to initially play a video content, it may perform the function of a later-described Resume API, when needed. The video content may be a content previously stored in a PVR storage or a real-time broadcast content, for example.

The Stop API is an API that stops playing of the video content. A Pause API temporarily stops playing of the video content. The Stop API and the Pause API are similar in that they make the video content not played. On the other hand, since the Stop API terminates playing of the video content, the Play API is needed to play the video content. When the video content is played, the playing starts with the beginning of the video content. Compared to the Stop API, the Pause API can pause for the video content. To resume the video content, the Play API or the Resume API may be used. When the video content is played, the playing starts with a part of the video content following the paused part of the video content.

The Resume API plays the video content, like the Play API, except that the Resume API plays the video content, starting after the paused part of the video content. When the video content is requested to be played from the beginning or playing of the video content is stopped by the Stop API, the Resume API may be disabled. That is, the Resume API may be enabled only after the Play API is followed by the Pause API. In this case, both the Resume API and the Play API may be enabled, or to avoid confusion, only one of the two APIs may be enabled.

APIs related to control of the play speed of a video content within the Playback Control APIs will be described. The APIs may include a SlowMotion API, a FastForward API, a FastRewind API, a SpeedRewind API, a FrameForward API, and a FrameRewind API. It is to be understood that the present invention is not limited to specific values presented herein in relation to the play speed control.

The SlowMotion API plays the video content in slow motions. On the assumption that a 1 multiple speed is a default play speed, a slow motion is made at a lower play speed, for example, a 0.5 multiple speed.

The FastForward API forwards the video content fast. Fast forward refers to a higher play speed than the default play speed, thus for example, a 2 multiple speed. In general, a play speed for fast forward is set as a default.

The FastRewind API rewinds the video content fast. Fast rewind is conceptually a counterpart of fast forward. Fast rewind may be a 2 multiple-speed rewinding, for example. The FastForward API and the FastRewind API may differ only in direction (i.e., forward and reverse) and have the same multiple speed since this speed is set as a default.

The Speed API plays the video content at a user-input speed. While it is impossible for the user to control the speed of the FastForward API and the FastRewind API because the speed is preset as a default, the Speed API enables the user to control the play speed of the video content. The play speed may be set to any value. For example, the user-set speed may be equal to any of the play speeds set for slow motion, fast forward, and fast rewind. Also, the Speed API is not limited to a specific direction and thus both forward and reverse are available to the Speed API. For example, if the user inputs a play speed of (−)1.5, this may mean that the play direction is reverse and the play speed is a 1.5 multiple speed. When the user inputs a play speed of (+)1.5, this may mean that the play direction is forward and the play speed is the 1.5 multiple speed. For this operation, the IPTV receiver may configure and provide a User Interface (UI) in which the user may enter an intended play speed. The UI may provide, for example, a set of numerals by which the user selects one of preset play speeds or enters an intended play speed.

The FrameForward API and the FrameRewind API are similar in that they play the video content on a frame basis, except for play directions. The FrameForward API and the FrameRewind API forward and rewind the video content, respectively. A frame unit on the basis of which the FrameForward API and the FrameRewind API play the video content may be one of I, B and P frame or a group of frames of the same or different types. The frame unit may be selected by the user.

The Jump API is used to jump from a current frame to a target frame. The StartJump API and The FinishJump API start or stop playing of the video content at a target frame jumped from a current frame. The target frame may be an already played part of the video content or a part of the video content yet to be played. While the StartJump API and the FinishJump API jump to a user-set frame, the Jump API jumps by a predetermined number of frames, the number being set as a default. A jump direction, or whether or not to play or whether or not to terminate the video content may be determined using a code. In relation to these APIs, the IPTV receiver may provide the user with a UI configured to set a jump play position and a jump end position. The StartJump API and the FinishJump API start to play the video content or stop playing of the video content, after jumping to a target frame, whereas the FrameForward API and the FrameRewind API may play frames one by one from the moments of their executions.

The Replay API plays a specific frame or a specific number of frames iteratively. For example, the IPTV receiver may provide a bar-type UI to the user so that the user sets a range to be played repeatedly.

The Skip API plays the video content, skipping a predetermined number of frames. The skip may take place over already-played frames or yet-to-be-played frames from a current frame. Considering the relationship between the afore-described FrameForward API and the FrameRewind API, preferably at least two frames are skipped by the Skip API. The Skip API is different from the Jump API in that the former plays the video content, continuously skipping a predetermined number of frames each time and the latter plays the video content at the default play speed after jumping a predetermined number of frames. The IPTV receiver may configure and provide a UI so that the user selects a skip range.

The Record API records the video content. The recording may performed in units of contents or in units of frames within a content. The recording may be any of instant recording, scheduled recording, and time shift. Also, the Record API may be executed in conjunction with another API. For instance, if the video content is to be time-shifted, the Record API may operate in conjunction with Time-Shift APIs. In this context, the IPTV receiver may configure and provide a UI such that the user selects one of instant recording, scheduled recording, and time shift, when he requests recording, and also the IPTV receiver may provide a UI such that the user is aware of a function associated with the user's selection and selects the function. The IPTV receiver stores recorded or time-shifted contents or frames distinguishably, along with the execution of the Record API.

The RecordScheduledProgram API starts scheduled recording of a specific content. The RecordScheduledProgram API may be called automatically in conjunction with the Record API rather than it is called by user selection. Also, the IPTV receiver may provide information about the content for which recording has been scheduled through the RecordScheduledProgram API to the user.

So far, the Playback Control APIs have been described. Each of the Playback Control APIs may be executed individually or in conjunction with a related API.

The IPTV receiver may edit streams of a content within an IP packet received by the PVR widget application according to a user input. The Stream Editor APIs are defined so that the IPTV receiver may appropriately control user-requested stream editing. These Stream Editor APIs will be described in detail.

The SetEditStartPosition API and the SetEditEndPosition API set the start and end positions of an area to be edited in a stream. These two APIs may be used as a set. The IPTV receiver may store editing areas set by the SetEditStartPosition API and the SetEditEndPosition API distinguishably on a stream basis in a memory. When a stream is to be edited, the ITF may extract information about the stream from the memory, configure a UI (e.g., a bar type) in which the user can set the start and end positions of an editing area in the stream, and provide the UI to the user.

The CancelEditSection API cancels setting of an editing area (defined by a start position and an end position) set by the SetEditStartPosition API and the SetEditEndPosition API. For example, upon receipt of a cancel function request, if the IPTV receiver accesses the memory and finds a plurality of streams having editing areas or a plurality of editing areas in one stream, the IPTV receiver may configure a UI in the form of a list and provide it to the user so that the user selects an editing area.

The IsEditSectionFixed API is an interface that asks whether to terminate the editing area setting function of the SetEditStartPosition API and the SetEditEndPosition API. When this function is requested, the IPTV receiver may provide a text-type UI that asks the user whether to end the editing area setting function in On Screen Display (OSD).

The DeleteEditInformation API deletes editing information stored in the memory in relation to stream editing. When there are a plurality of streams having editing information or a stream having a plurality of pieces of editing information, the IPTV receiver may access the memory, read the editing information from the memory, and provide the editing information in a list-type UI to the user, so that the user selects editing information to be deleted. Or when the DeleteEditInformation API is executed, the IPTV receiver may delete all editing information in the memory. In this case, the IPTV receiver may provide a UI concerning the deletion function to the user. When implementation of the delete function is confirmed by the user, the IPTV receiver may delete the editing information.

The SetRepeatStartPosition API and the SetRepeatEndPosition API set the start and end position of an iterative play range of a stream. The IPTV receiver may store settings of iterative play areas set by these two APIs distinguishably on a stream basis in the memory. The IPTV receiver may provide, for example, a bar-type UI to the user so that the user sets the start and end positions of an iterative play area in a stream.

The IsRepeatSectionFixed API asks the user whether to end the iterative play area setting of the SetRepeatStartPosition API and the SetRepeatEndPosition API. For this function, the IPTV receiver may provide a UI that asks the user to confirm the termination of the iterative play area setting.

The DeleteRepeat API deletes the iterative play area setting of the SetRepeatStartPosition API and the SetRepeatEndPosition API. In the presence of a plurality of streams for which iterative play areas have been set or a stream for which a plurality of iterative play areas have been set, the IPTV receiver may configure a list-type UI and provide it to the user in order to allow the user to make a choice among them.

Now a description will be made of bookmark-related APIs. While the bookmark-related APIs fall within the Stream Editor category, they may belong to a separate category. Even in the latter case, the bookmark-related APIs may be used in conjunction with another category.

The SetBookmark API bookmarks a selected area. In general, the area refers typically to, but not limited to, a range. For instance, the area may refer to a specific frame. The IPTV receiver may store selected areas distinguishably in a bookmark section of the memory or in a memory dedicated for bookmarks. Also, the IPTV receiver may store the selected areas distinguishably on a stream basis or on a content basis.

The RemoveBookmark API removes an area set by the SetBookmark API or a bookmark for the area. If the IPTV receiver accesses the memory and detects a plurality of bookmarked streams or a stream with a plurality of bookmarks, the IPTV receiver may provide a list-type UI so that the user selects an area to be removed or a bookmark for an area to be removed. Or when the RemoveBookmark API is called, the IPTV receiver may remove all of bookmarks from the memory. In addition, when this API is called, the IPTV receiver may provide the user with a UI that asks whether to remove the selected area or the selected bookmark in OSD in order to remove it after the user's confirmation.

The GetFavoriteList API is an API that gets a list set as favorites. Favorite, which refers to a bookmark selected as preferred, is a higher-layer concept than bookmark. However, this concept is defined for the convenience sake. Thus the term 'favorite' may be interchangeable with 'bookmark' in the same meaning. When the GetFavoriteList API is called, the IPTV receiver may provide a list of bookmarks set by the SetBookmark API, a list of bookmarks set as favorites, or a list of stream areas set as user preferences. In addition, the IPTV receiver may provide the favorite list as a UI, distinguishably on a stream basis. For example, the IPTV receiver calls the GetFavoriteList API when the RemoveBookmarkAPl is called so that the user may determine whether to remove a favorite.

The RegisterFavorite API and the UnregisterFavorite API respectively register bookmarked areas or other areas to the favorite list and unregister them from the favorite list. When either of the RegisterFavorite API and the UnregisterFavorite API is called, the IPTV receiver registers an area in the favorite list or unregisters it from the favorite list. Upon invocation of the RegisterFavorite API, the IPTV receiver may provide a UI that allows the user to register favorites by type, for example, by genre.

The SetRateOfFavorite API sets a rating for each area listed in the favorite list. The rating means a viewing rating in its general sense. The IPTV receiver may configure a UI that allows the user to set a password such as a code, for access to specific areas by an authorized person only.

The OpenFavoriteList API and the CloseFavoriteList API open and close favorite lists registered by the RegisterFavorite API. If the favorite lists are registered by type, the IPTV receiver configures and provides a UI that allows the user to select a type. Thus the IPTV receiver may provide only a favorite list of the selected type. Also, when the user selects a specific rating, the IPTV receiver may provide only favorite lists having the selected rating to the user.

The LoadFavoriteList API loads favorite lists. The IPTV receiver may store the loaded favorite lists distinguishably in the memory.

The IPTV receiver may control contents according to a user input. APIs related to the content management fall into the Content Manager APIs, which will be described below.

The Copy API copies a content stored in the memory to a designated output device. When this function is called, the IPTV receiver may configure a UI with a content to be copied and an output device to which the content will be copied and provide the UI to the user.

The Move API moves a content stored in the memory to a designated output device. When this function is called, the IPTV receiver may configure a UI with a content to be moved and an output device to which the content will be moved and provide the UI to the user. Compared to the Copy API, when the Move API is called, a content may be deleted irrecoverably from the device that has executed this command, simultaneously with the movement of the content. However, the Copy API leaves the content as it is in the device that has executed the copy command, even after the content is copied.

The Remove API removes a content stored in the memory from the current device. When this function is called, the IPTV receiver configures a list of contents stored in the memory as a UI and provides the UI so as to remove a user-selected content.

The SetOutputInterface API sets an output device to which a content is copied or moved from the memory. The SetOutputInterface API may be executed independently or may be called automatically in conjunction with the call of the Copy API or the Move API. The IPTV receiver may configure a UI with a list of accessible output devices and provide the UI to the user so that the user makes a choice among the output devices.

The SetInputInterface API sets an input device when a content is copied or moved. The IPTV receiver may configure a UI with a list of accessible input devices and provide the UI to the user so that the user makes a choice among the input devices.

The Stop API stops an operation set by a current called function.

The GetOutputInterface API and the GetInputInterface API confirm an output device and an input device that are currently set.

The GetStatus API is an API that, when information for identifying a progress state is returned from a module during an operation of the called Copy API, Move API, or Stop API, outputs the returned information. The user may find out the progress state through the PVR widget application.

When the user is viewing a real-time broadcast program, the IPTV receiver may perform a time-shift function by the PVR widget application. Time-shift APIs will be described below.

The Initialize API initializes an object for time shifting. The object may refer to, for example, the memory. Accordingly, when this function is called, the IPTV receiver initializes the memory or sets hardware to a time-shift enabling state.

The Finalize API ends an object for time shifting. The object is used in the same meaning of the above-described object. When this function is called, the IPTV receiver finalizes the use of the memory or the hardware.

The StartTimeShift API and the StopTimeShift API start and end the time shift, respectively.

The PauseTimeShift API temporarily stops the time shift, and the ResumeTimeShift API resumes the time shift paused by the PauseTimeShift API.

The Play API is an API that simultaneously time-shifts and plays a content, and the Stop API stops the playing of the content as performed by the Play API. When the Stop API is called, the time shift of the content continues without interruptions although the playing of the content is stopped.

The GetStartPointOfTimeshift API returns the start point of a time shift, and the SetStartPointOfTimeshift sets a target point as the start point of the time shift.

The GetCurrentSizeOfAvailableTimeshift API returns a current available capacity when a time shift is intended.

The GetTimeshiftStatus API is an API that the PVR widget application calls to identify a current time-shift status. This API is used for the PVR widget application to display a time-shift available time or a current time progress on a display. The NotifyTimeshiftStatus API is used to report the current time-shift status when the GetTimeshiftStatus API is called. Therefore, when the GetTimeshiftStatus API is called, the NotifyTimeshiftStatus API is automatically called. This means that the NotifyTimeshiftStatus API is not available for user selection.

With reference to FIGS. 3 to 15, methods for downloading the PVR widget application, installing the downloaded PVR widget application, and performing PVR recording, time-shifting, and content copy or movement in the IPTV receiver will be described below.

Figure 16:
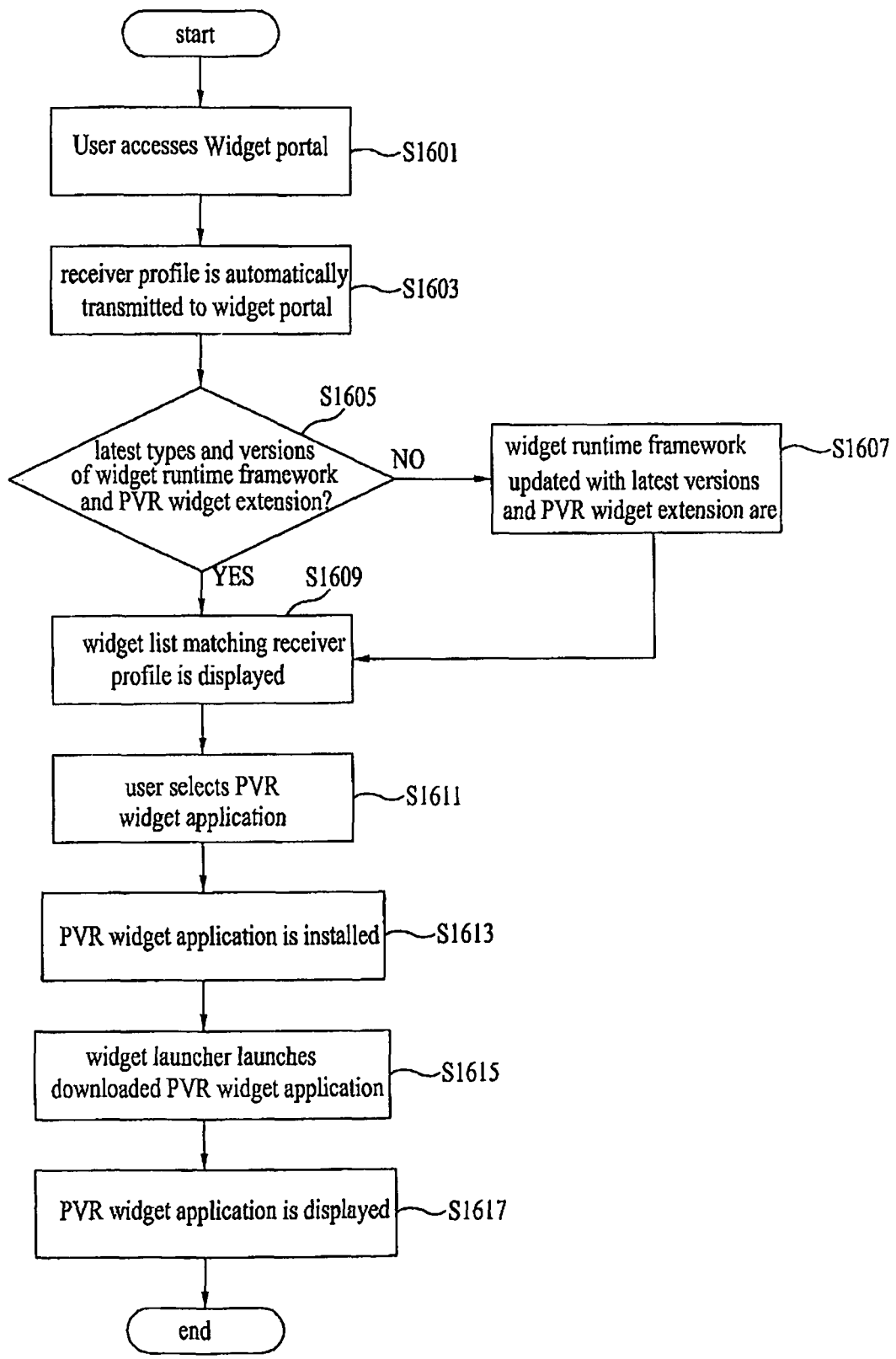
FIG. 16 is a flowchart illustrating an operation for installing a PVR widget application using the PVR widget extension module according to an exemplary embodiment of the present invention.

FIG. 16 is a flowchart illustrating an operation for installing a PVR widget application using a PVR widget extension module according to an exemplary embodiment of the present invention.

Referring to FIG. 16, the user accesses a widget portal by means of a remote controller in step S1601.

The IPTV receiver transmits a receiver profile to the widget portal in step S1603.

In step S1605, the IPTV receiver determines whether the types and versions of the widget runtime framework module and PVR widget extension module are latest ones based on the receiver profile by communicating with the widget portal.

If the types and versions of the widget runtime framework module and PVR widget extension module are not latest ones, the IPTV receiver downloads their latest versions and updates the widget runtime framework module and PVR widget extension module with the latest versions in step S1607.

If the types and versions of the widget runtime framework module and PVR widget extension module are latest ones in step S1605 or the upgrade is completed in step S1607, the IPTV receiver receives a widget profile list that is transmitted based on the receiver profile from the widget portal and displays the widget profile list in step S1609.

In step S1611, the IPTV receiver receives a user input concerning installation of a PVR widget application selected from the widget profile list by the user.

The IPTV receiver installs the PVR widget application in step S1613.

The widget launcher launches the PVR widget application in step S1615.

The PVR widget application is displayed on the display in step S1617.

In this manner, the PVR widget application may be installed and upgraded.

Figure 17:
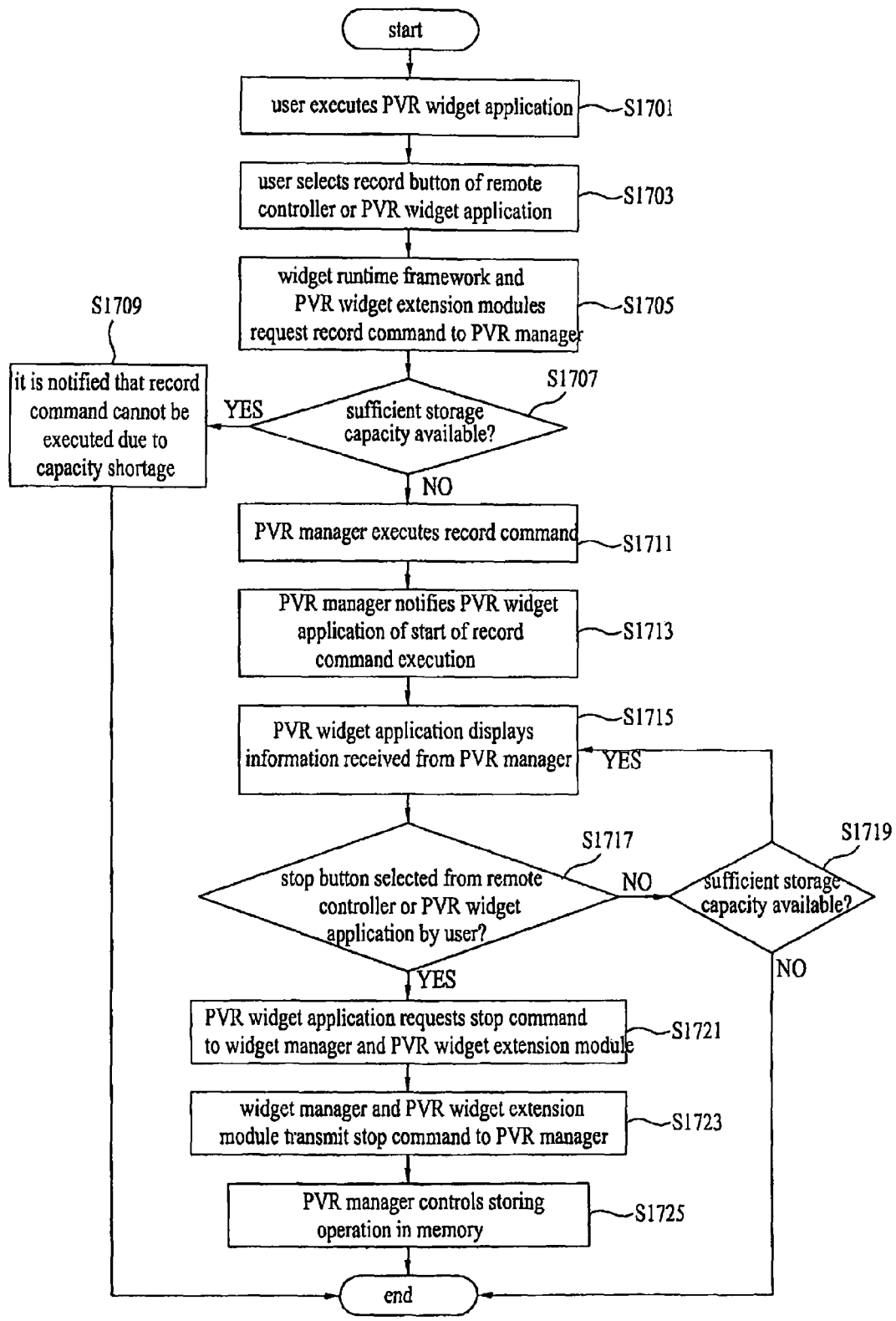
FIG. 17 is a flowchart illustrating a PVR recording method using the PVR widget application according to an exemplary embodiment of the present invention.

FIG. 17 is a flowchart illustrating a PVR recording method using the PVR widget application according to an exemplary embodiment of the present invention.

Referring to FIG. 17, the user executes the PVR widget application in step S1701.

The user selects a record button in the remote controller or in the PVR widget application in step 1703.

In step S1705, the widget runtime framework module and the PVR widget extension module request a record command to the PVR manager.

An available memory capacity is checked in step S1607.

If there is not a sufficient memory capacity for recording, a notification that the record command cannot be executed due to the shortage of memory capacity is displayed on the display in step S1709.

On the other hand, in the presence of a sufficient memory capacity for recording in step S1707, the PVR manager executes the record command in step S1611.

In step S1713, the PVR manager returns information indicating the start of the record command execution to the PVR widget application.

The PVR widget application displays the returned information on the display in step S1715.

It is determined whether the user has pressed a stop button in the remote controller or has selected a stop button in the PVR widget application in step S1717.

In step S1719, when the stop button has not been selected, an available memory capacity is checked.

In the absence of a sufficient memory capacity, the procedure returns to step S1715. In the presence of a sufficient memory capacity, the procedure ends.

In step S1721, the PVR widget application requests a stop command to the widget manager and the PVR widget extension module.

The widget manager and the PVR widget extension module transmit the stop command to the PVR manager in step S1723.

In step S1725, the PVR manager controls the memory to stop the storing operation.

Figure 18:
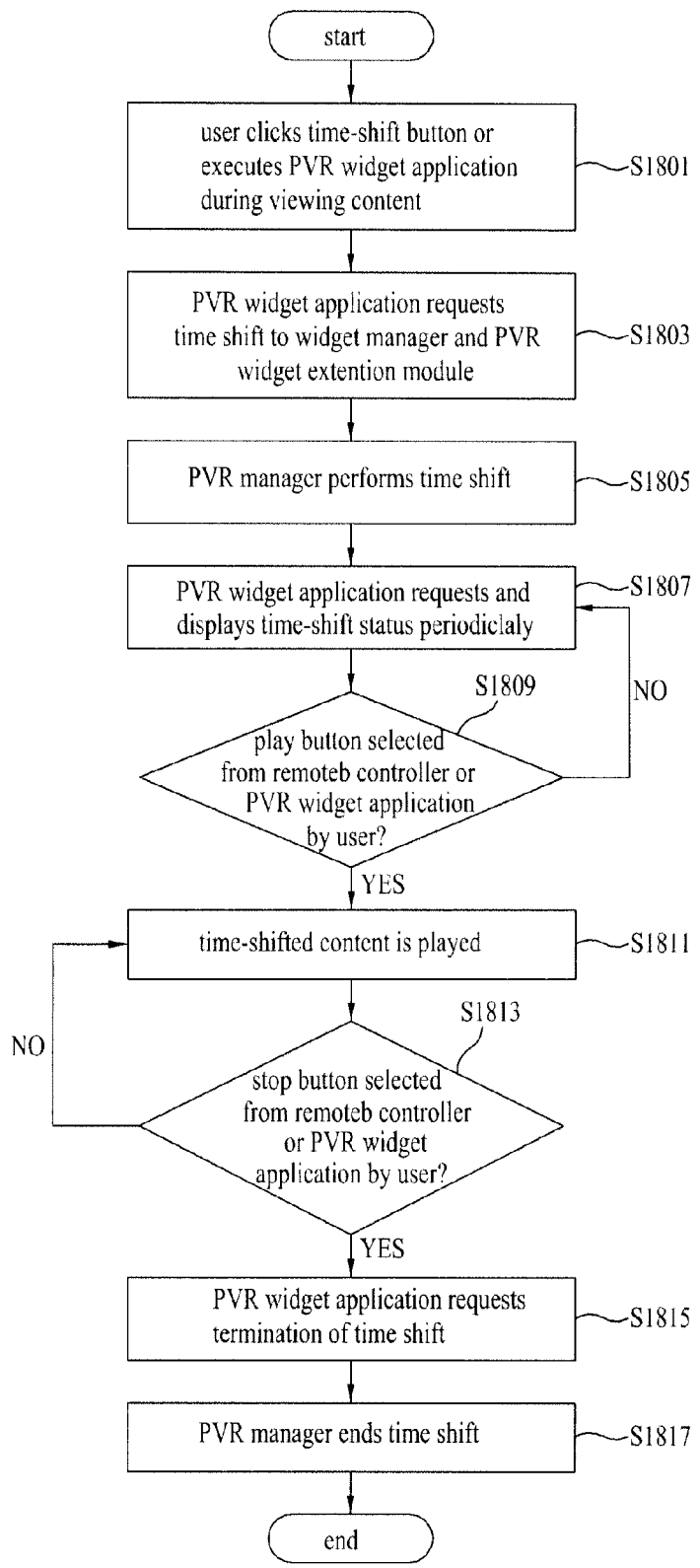
FIG. 18 is a flowchart illustrating a time shift method using the PVR widget application according to an exemplary embodiment of the present invention.

FIG. 18 is a flowchart illustrating a time shift method using the PVR widget application according to an exemplary embodiment of the present invention.

Referring to FIG. 18, the user selects a time shift button or executes the PVR widget application during viewing a content in step S1801.

In step S1803, the PVR widget application requests starting of a time shift to the widget manager and the PVR widget extension module.

The PVR manager performs the time shift in step S1805.

In step S1807, the PVR widget application requests a time shift status periodically and outputs the time shift status on the display.

It is determined whether the user has pressed a play button in the remote controller or has requested play through the PVR widget application during the time shift in step S1809.

If the user has not requested play, the procedure returns to step S1807. On the other hand, if the user has requested play, the time-shifted content is played in step S1811.

In step S1813, it is determined whether the user has selected a stop button in the remote controller or has requested stop through the PVR widget application.

If stop has not been requested in step S1813, the time-shifted content is continuously played. On the other hand, if stop has been requested in step S1813, the PVR widget application requests termination of the time-shift operation in step S1815.

The PVR manager ends the time shift in step S1817.

Figure 19:
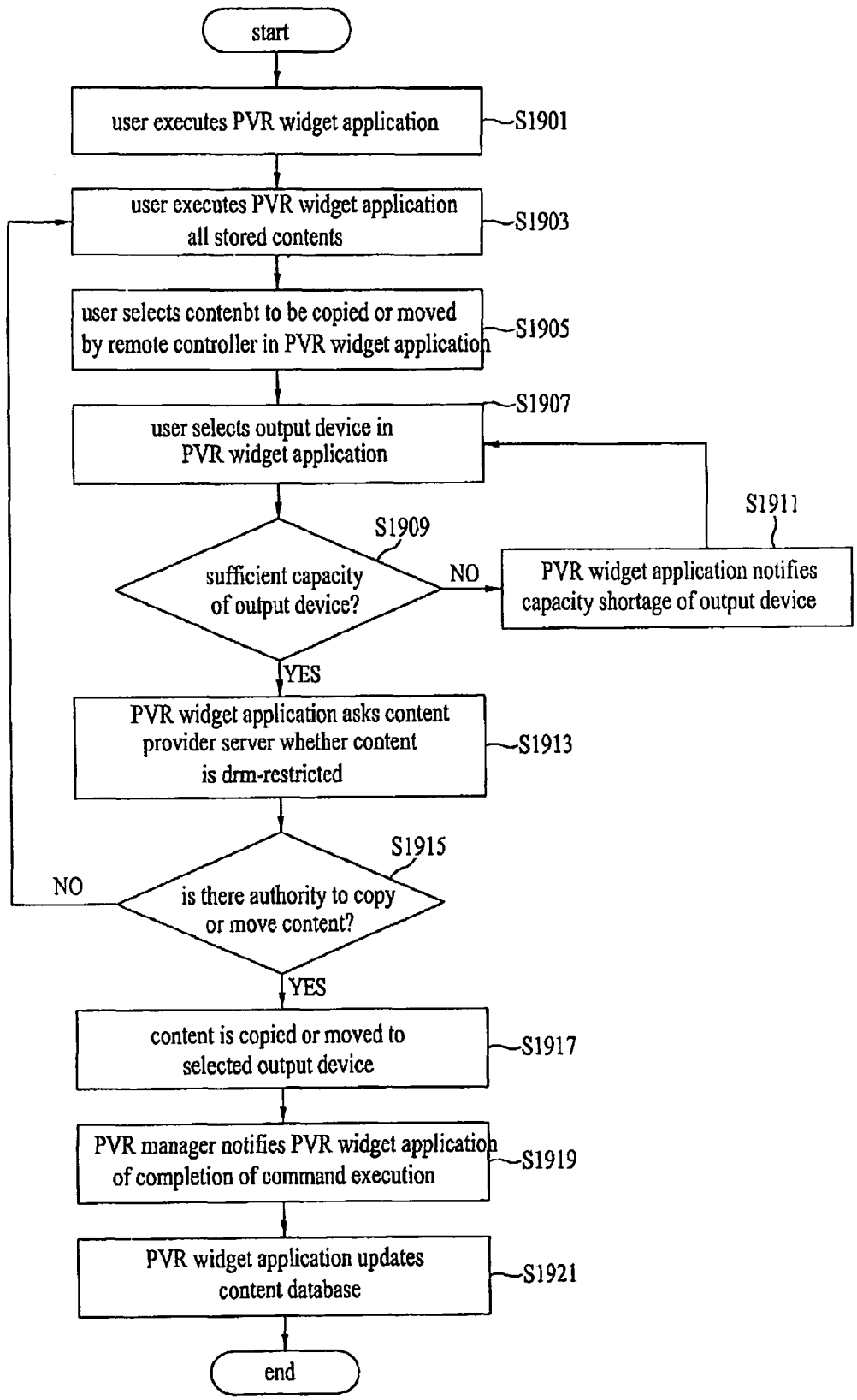
FIG. 19 is a flowchart illustrating a method for moving a content using the PVR widget application according to an exemplary embodiment of the present invention.

FIG. 19 is a flowchart illustrating a method for moving a content using the PVR widget application according to an exemplary embodiment of the present invention.

Referring to FIG. 19, the user executes the PVR widget application in step S1901.

The PVR widget application displays all of stored contents in step S1903.

The user selects a content to be copied or moved in the PVR widget application by the remote controller in step S1905.

In step S1907, the user selects an output device to which the content is to be copied or moved (output) in the PVR widget application.

The PVR widget application checks an available capacity of the output device in step S1909.

In step S1911, if the capacity of the output device is not sufficient, the PVR widget application notifies shortage of the capacity of the output device on the display and the procedure returns to step S1907.

If the output device has a sufficient capacity, the PVR widget application requests the content provider server to check whether the content is DRM-restricted in step S1913.

It is determined whether the content is allowed to be copied or moved in step S1915.

In the absence of the authority to copy or move the content in step S1915, the procedure returns to step S1903. In the presence of the authority to copy or move the content in step S1915, the content is copied or moved to the output device in step S1917.

In step S1919, the PVR manager notifies the PVR widget application of completion of the command execution.

In step S1921, the PVR widget application updates the content database and displays a screen again.

Hereinafter, an exemplary IPTV receiver operating the PVR Widget application will be described in detail.

Figure 20:
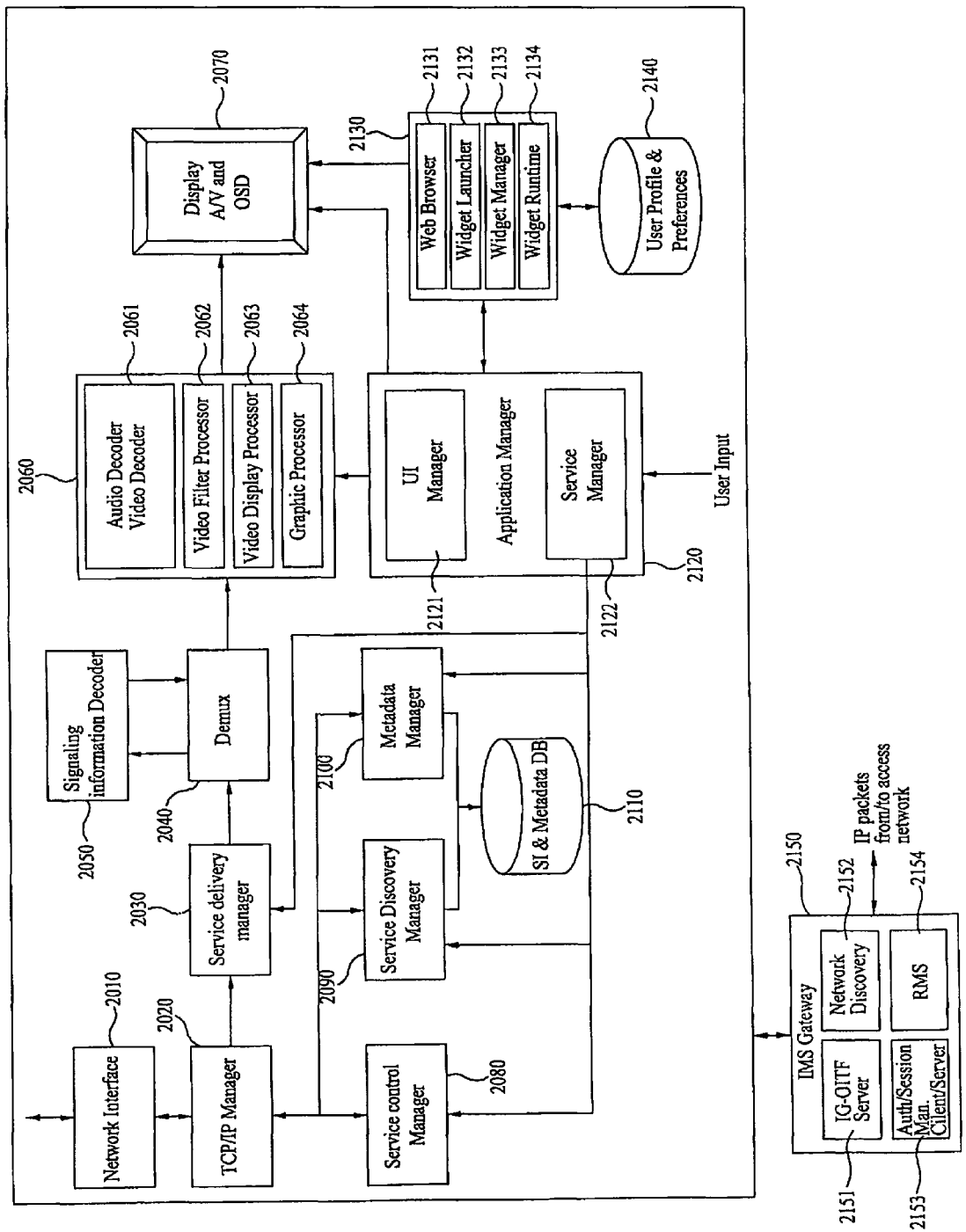
FIG. 20 is a block diagram of an IPTV Terminal Function (ITF) according to an exemplary embodiment of the present invention.

FIG. 20 is an exemplary block diagram of the IPTV receiver according to the present invention.

Referring to FIG. 20, an OITF is an abbreviation for Open IPTV Terminal Function. The OITF is a functional collection of receiver that is composed of necessary at the least functional module to support IPTV service based upon Non-IMS.

Herein, the user can use the IPTV service in the OITF which is added IMS Gateway (IG). The IG may contain necessary functions to access IPTV service based upon IMS which is based upon IMS core network.

The OITF and the IG is connected by an interface which is named HNI-IGI. The HNI-IGI interface can make OITF to use IG function. The IG function can make OITF to use IPTV service based upon IMS.

Referring to FIG. 20, the IPTV receiver 2000 comprises a network interface 2010, a TCP/IP Manager 2020, a service delivery manager 2030, a Demultiplexer (DEMUX) 2040, a signaling information decoder 2050, an A/V processor 2060, a display unit 2070, a service control manager 2080, a service discovery manager 2090, a metadata manager 2100, an SI & metadata DB 2110, an application manager 2120, a Widget processor 2130, and a user profile & preferences storage 2140.

The network interface 2010 receives and sends IPTV packets. The network interface 2010 connects a network via physical and data link layers.

The TCP/IP manager (or Internet protocol manager) 2020 is responsible for an end-to-end (source-to-destination) packet delivery. The TCP/IP manager 2020 classifies each packet into an appropriate protocol manager.

The service delivery manager 2030 is responsible for handling real-time streaming data and downloading contents. Also, the service delivery manager 2030 is responsible for retrieving contents from a content DB for later consuming (or usage). In this case, a Real-Time Transport Protocol/RTP Control Protocol (RTP/RTCP) may be used with an MPEG-2 TS. MPEG-2 packets are encapsulated in the RTP. The service delivery manager 2030 parses the RTP packets and sends the parsed transport packets to the DEMUX 2040. The service delivery manager 2030 sends a feedback on the network reception quality using the RTCP. The MPEG-2 transport packets may be carried directly in the UDP without the RTP. For content downloading, an HTTP or FLUTE protocol may be used as the delivery protocol.

The DEMUX 2040 demultiplexes audio, video, and Program Specific Information/Program and System Information Protocol (PSI/PSIP) tables from inputted transport packets.

In this case, the demultiplexing of the DEMUX 2040 is controlled for PSI/PSIP tables by the signaling information decoder 2050. At this time, the DEMUX 2040 creates the sections of PSI/PSIP tables and sends them to the signaling information decoder 2050. Also, the demultiplexing of the DEMUX 2040 is controlled for A/V transport packets by the A/V processor 2060.

The signaling information decoder 2050 sets Packet Identifiers (PIDs) for the signaling information (i.e., PSI/PSIP and Digital Video Broadcasting-System Information (DVB-SI) tables) to the DEMUX 2040. The signaling information decoder 2050 decodes the private sections of the PSI/PSIP and/or DVB-SI sent by the DEMUX 2040. The decoding result is used to demultiplex inputted transport packets (e.g., set Audio and Video PID to the DEMUX 2040).

The A/V processor 2060 may include an A/V decoder 2061, a video filter processor 2062, a video display processor 2063, and a graphic processor 2064. The A/V decoder 2061 decodes audio and video (A/V) elementary stream packets. The video filter processor 2062 will process the video filter in all user-selected areas or a whole (or entire) video screen. The video filter processor 2062 may access the video frame buffer memory (not shown) to manipulate or adjust the video or still picture. The video display processor 2063 controls the picture-in-picture (PIP) video and/or the picture-on-picture (POP) video on the display screen. The video display processor 2063 also includes a video scale in the end of MPEG-2 decoder system. The graphic processor 2064 controls the OSD plane on the screen to display a UI menu and notification dialogue messages.

The display unit 2070 receives audio and video data from the A/V Decoder 2061. The display unit 2070 controls video and audio data and displays the data on the screen and through the speaker. The display unit 2070 also controls on-screen display (OSD) graphic data.

The Application Manager 2120 may support the graphic user interface (GUI) on the TV screen. The application manager 2120 may receive a user key by a remote controller or a front panel. And, the application manager 2120 may manage the states of the entire TV system.

The service manager 2122 may control all of the other managers related to the services, such as the service control manager 2080, the service delivery manager 2030, an IG-OITF client (not shown), the service discovery manager 2090, and the metadata manager 2100. The service manager 2122 may be responsible for serving IPTV services.

The SI & metadata DB 2110 is a database for service discovery information and metadata related to the services.

The service discovery (SD) manager 2100 may enable the discovery of IPTV services over a bi-directional IP network and may provide all information for selecting the corresponding service.

The service control manager 2080 may be responsible for selecting and controlling services and managing sessions. The service control manager 2080 may select a live broadcasting service, using the Internet Group Management Protocol (IGMP) or Real Time Streaming Protocol (RTSP) protocol. Also, the service control manager 2080 may select VOD contents, using the RTSP protocol. When using the International Measurement System (IMS), a Session Initiation Protocol (SIP) protocol may be used for initiating and managing sessions through the IMS gateway. The RTSP protocol may be used in the controlling of the delivery of broadcast TV and audio as well as for an on-demand delivery. The RTSP protocol may use a persistent TCP connection and allow a trick mode control on real-time media streaming.

The user profile & preferences storage 2140 may keep the user information, all information associated to the widget (installed widget and active/inactive widgets), preferences, and the IPTV receiver's hardware compatibility and standard profile. The user profile data may be read from a Widget launcher 2132, a Widget manager 2133, and a web browser 2131, when the user logs into the system or deletes downloaded widget applications.

The widget processor 2130 may include the web browser 2131, the widget launcher 2132, the widget manager 2133, and the widget runtime framework 2134. The widget launcher 422132 may execute an installed widget application when the user logs in. And, the widget launcher 2132 may execute an activated widget application when the user changes the downloaded widget application. The widget manager 2133 may display all widget applications that can be installed and executed in the IPTV receiver. And, the widget manager 2133 may request downloading of a widget application that the user selected from the servers. Also, the widget manager 2133 may activate/inactivate the downloaded widget. The widget manager 2133 may delete the downloaded or running widget application (or widget application being played). The widget manager 2133 may control the running widget application and change the location of the widget application within the display screen. The widget runtime framework 2134 may be used for a widget application that calls the predefined module or controls the interface in the IPTV receiver. The widget runtime framework 2134 can control the PVR Extension that is one of manufacturer's extensions and operated with widget runtime middleware 2134. The PVR widget application can call the predefined PVR Extension APIs and there are many links to the PVR manager's operations. The web browser (declarative application environment: DAE) 2131 may render Hypertext Mark-up Language (HTML) pages on the screen and parse documents according to a W3C specification.

The IMS Gateway 2150 may contain an IG-OITF Server 2151, a Network discovery 2152, an Authentication/Session Management Client/Server 2153 and a RMS 2154. The IG-OITF Server 2151 can exposes authentication and session management client/server functionalities to the OITF for managed IPTV services via HTTP and/or other protocols as required. The Network discovery 2152 can be responsible for the discovery of and attachment to an IMS service. The Authentication/Session Management Client/Server 2153 can be responsible for subscriber authentication and any session management required of managed networks. The RMS 2154 can be responsible for remote management functions in a managed environment.

The above-described structure enables a manufacturer to use general PVR service widget components in a PVR widget application according to the present invention. This structure is characterized by definition of a widget object for controlling a PVR storage used in a digital TV in a middleware called a widget runtime framework. In addition, methods for realizing a PVR widget object in a receiver are defined. The manufacturer may provide APIs over an Open Internet so that a user can download a PVR widget application or form a widget using PVR service widget components. Further, if the receiver is allowed to use the PVR widget application, a service provider that transmits contents may support a strict DRM function and actually manage contents. This may be possible with use of DRM extension along with PVR widget extension for an IPTV receiver and an Internet-enabled TV.

As is apparent from the above description, a content provider or a service provider can control contents that are recorded and played in an IPTV. Also, widgets for providing user-friendly interfaces are provided to the user so that the user can download selected widgets and utilize recording and play functions of his IPTV receiver using the downloaded widgets.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing an Internet Protocol Television (IPTV) service in an IPTV receiver, the method comprising:
   accessing a server;
   transmitting at least one of a receiver profile and an user profile to the accessed server;
   receiving an available widget application list from the accessed server based upon the transmitted at least one of the receiver profile and the user profile;
   displaying the received available widget application list; and
   selecting a widget application from the displayed available widget application list;
   downloading the selected widget application from the server;
   receiving an IPTV service which carries a content;
   executing the downloaded widget application according to the first request at a browser;
   and processing the IPTV service through the executed widget application,
   wherein the IPTV service and the widget application is received based on at least one of a receiver profile and a user profile,
   wherein the step of processing the IPTV service includes at least one of outputting and recording a content included in the IPTV service, and perform the IPTV service based on both a first Application Programming Interface (API) which is predefined commonly for all widget application and a second API which is unique for the downloaded widget application, and wherein the second API calls at least one function of a trick play, a scheduled recording, editing a recorded content and extracting an image.

2. The method of claim 1, wherein the first or second API includes a PVR element for an available PVR function corresponding to the IPTV receiver.

3. The method of claim 2, wherein the PVR element includes any one of a playback control element, a stream editor element, a content manager element, and a time-shift element.

4. The method of claim 3, wherein the PVR element further includes a bookmark element.

5. The method of claim 4, wherein the downloaded widget application controls the IPTV receiver to perform the PVR function by calling the first or second API.

6. The method of claim 4, wherein the playback control element includes an element performing a function related to playing a stored content, stopping to play the stored content, a playing speed and a playing location.

7. The method of claim 4, wherein the playback control element includes an element performing a function related to recording at least one of contents, the recording including any one of an instant recording, a prescheduled recording, and a time-shift.

8. An Internet Protocol Television (IPTV) receiver for providing an IPTV service, the IPTV receiver comprising:
   a storage unit for storing at least one of Application Programming Interface (API) for the IPTV service;

a first receiving unit for receiving an IPTV service which carries a content and a list of widget application available and downloading a widget application selected from the list from a server based on at least one of a receiver profile and an user profile;

a second receiving unit for receiving a first request selecting the widget application from the list, a second request executing the downloaded widget application from a user, and a third request performing the IPTV service through the executed widget application from the user;

a controller for controlling the list of widget application to be displayed on a screen, the downloaded widget application to execute at a browser according to the received second request and the IPTV service to be performed according to the third request; and the browser for rendering a page in correspond to the downloaded widget application, wherein the controller further controls to be at least one of outputting and recording a content included in the IPTV service, and perform the IPTV service based on both a first API which is predefined commonly for all widget application and a second API which is unique for the downloaded widget application, and wherein the second API calls at least one of function of a trick play, a scheduled recording, editing a recorded content and extracting an image.

9. The IPTV receiver of claim 8, wherein the controller controls at least one of the receiver profile and the user profile to transmit to the server, the first API or the second API including a PVR element on available PVR functions in the IPTV receiver.

10. The IPTV receiver of claim 9, wherein the PVR element includes any one of a playback control element, a stream editor element, a content manager element, and a time-shift element.

11. The IPTV receiver of claim 10, wherein the PVR element further includes a bookmark element.

12. The IPTV receiver of claim 11, wherein the widget application controls the controller to perform the specific PVR function by calling at least one of the first and second API from the storage unit.

13. The IPTV receiver of claim 11, wherein the playback control element includes an element performing a function related to playing a stored content, stopping to play the stored content, a playing speed and a playing location.

14. The method of claim 11, wherein the playback control element includes an element performing a function related to recording at least one of contents, the recording including any one of an instant recording, a prescheduled recording, and a time-shift.

* * * * *